US012366266B2

(12) United States Patent
Kitamura et al.

(10) Patent No.: US 12,366,266 B2
(45) Date of Patent: Jul. 22, 2025

(54) ROLLING BEARING

(71) Applicant: MINEBEA MITSUMI Inc., Nagano (JP)

(72) Inventors: Atsushi Kitamura, Nagano (JP); Shigeyuki Adachi, Nagano (JP); Toshiaki Asakawa, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/572,528

(22) PCT Filed: Jul. 1, 2022

(86) PCT No.: PCT/JP2022/026531
§ 371 (c)(1),
(2) Date: Dec. 20, 2023

(87) PCT Pub. No.: WO2023/277193
PCT Pub. Date: Jan. 5, 2023

(65) Prior Publication Data
US 2024/0264017 A1     Aug. 8, 2024

(30) Foreign Application Priority Data

Jul. 2, 2021  (JP) ................................. 2021-111064

(51) Int. Cl.
*F16C 41/00*     (2006.01)
*F16C 19/52*     (2006.01)
*G01L 5/00*      (2006.01)

(52) U.S. Cl.
CPC .............. *F16C 41/00* (2013.01); *F16C 19/52* (2013.01); *G01L 5/0019* (2013.01); *F16C 2233/00* (2013.01)

(58) Field of Classification Search
CPC ...... F16C 19/52; F16C 19/522; F16C 19/525; F16C 41/00; F16C 2233/00
See application file for complete search history.

(56) References Cited

U.S. PATENT DOCUMENTS

| 4,203,319 A | * | 5/1980 | Lechler | ................. | G01L 5/0019 |
| | | | | | 73/862.541 |
| 4,341,122 A | | 7/1982 | Lechler et al. | | |

(Continued)

FOREIGN PATENT DOCUMENTS

| CN | 1751240 | 3/2006 |
| CN | 1854545 | 11/2006 |

(Continued)

OTHER PUBLICATIONS

Translation of WO2019/065841 obtained Jun. 6, 2024.*

(Continued)

*Primary Examiner* — James Pilkington
(74) *Attorney, Agent, or Firm* — IPUSA, PLLC

(57) ABSTRACT

A rolling bearing includes an outer ring having a predetermined rotation axis; an inner ring disposed coaxially with the outer ring and situated on an inner peripheral side of the outer ring; multiple rolling elements disposed between the outer ring and the inner ring; and a strain gauge disposed on an outer peripheral surface of the outer ring or an inner peripheral surface of the inner ring. The strain gauge includes three or more detector elements that are disposed on the outer peripheral surface of the outer ring or the inner peripheral surface of the inner ring, and the three or more detector elements include at least two detector elements at different locations in a circumferential direction of the outer ring or the inner ring, the at least two detector elements being situated at different locations in a direction of the rotation axis.

28 Claims, 11 Drawing Sheets

(56) References Cited

U.S. PATENT DOCUMENTS

| | | | | |
|---|---|---|---|---|
| 7,661,320 | B2 * | 2/2010 | Duret | ............ G01M 13/04 73/862.322 |
| 2002/0092360 | A1 | 7/2002 | McDearmon | |
| 2006/0144164 | A1 | 7/2006 | Pecher et al. | |
| 2009/0114004 | A1 | 5/2009 | Ozaki et al. | |
| 2014/0331755 | A1 | 11/2014 | Shimoyama et al. | |
| 2017/0016786 | A1 | 1/2017 | Heim | |
| 2021/0018307 | A1 | 1/2021 | Toda et al. | |
| 2021/0170789 | A1 | 6/2021 | Bertola et al. | |
| 2022/0243771 | A1 | 8/2022 | Fujiura et al. | |

FOREIGN PATENT DOCUMENTS

| | | |
|---|---|---|
| CN | 104142199 | 11/2014 |
| CN | 106438727 | 2/2017 |
| CN | 113022221 | 6/2021 |
| DE | 10136438 | 3/2002 |
| EP | 1717464 | 11/2006 |
| FR | 2869966 | 11/2005 |
| JP | S55-132926 | 10/1980 |
| JP | 2001-254742 | 9/2001 |
| JP | 2003-530565 | 10/2003 |
| JP | 2005-249594 | 9/2005 |
| JP | 2011-149861 | 8/2011 |
| JP | 2011-185944 | 9/2011 |
| JP | 2017-096445 | 6/2017 |
| JP | 2021-001807 | 1/2021 |
| JP | 2021-183867 | 12/2021 |
| WO | 2007/105367 | 9/2007 |
| WO | WO-2019065841 A1 * | 4/2019 ............ G01B 7/16 |

OTHER PUBLICATIONS

International Search Report mailed on Jun. 14, 2022 with respect to the related PCT application No. PCT/JP2022/014730.

International Preliminary Report on Patentability for PCT/JP2022/014730 on Jan. 11, 2024.

International Preliminary Report on Patentability for PCT/JP2022/026531 on Jan. 11, 2024.

Office Action mailed on Mar. 28, 2024 with respect to the corresponding Chinese patent application No. 202280045058.0.

International Search Report for PCT/JP2022/026531 mailed on Sep. 13, 2022.

Extended European Search Report mailed on Jun. 27, 2024 with respect to the corresponding European patent application No. 22833338.1.

* cited by examiner

FIG.13
(a)
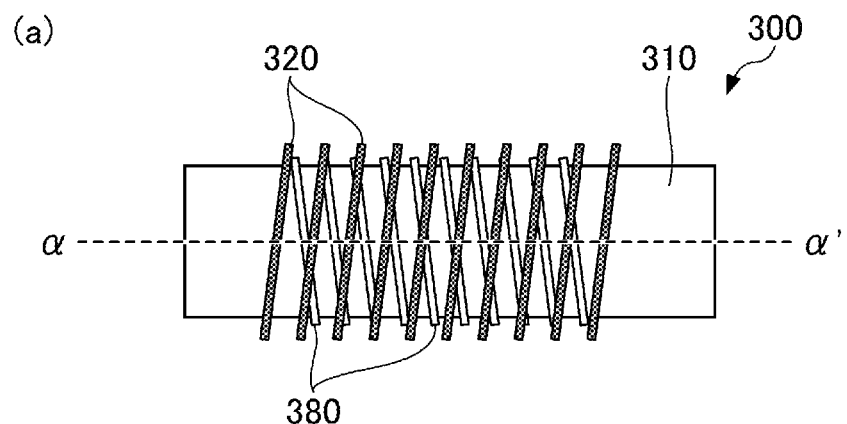
(b)
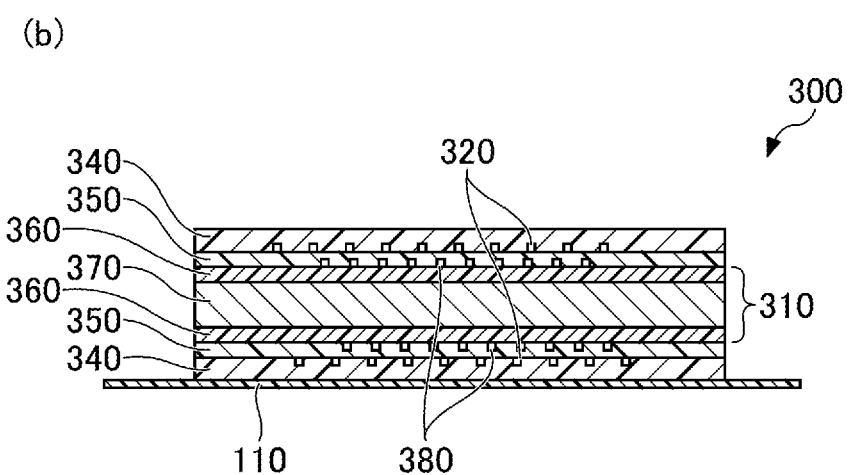

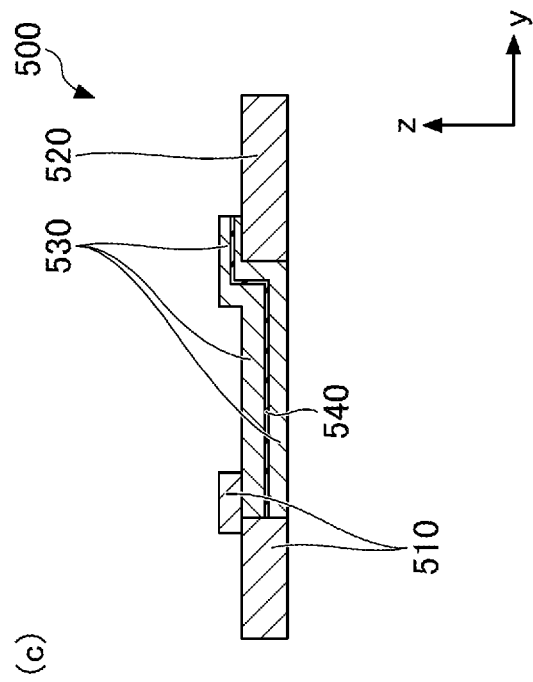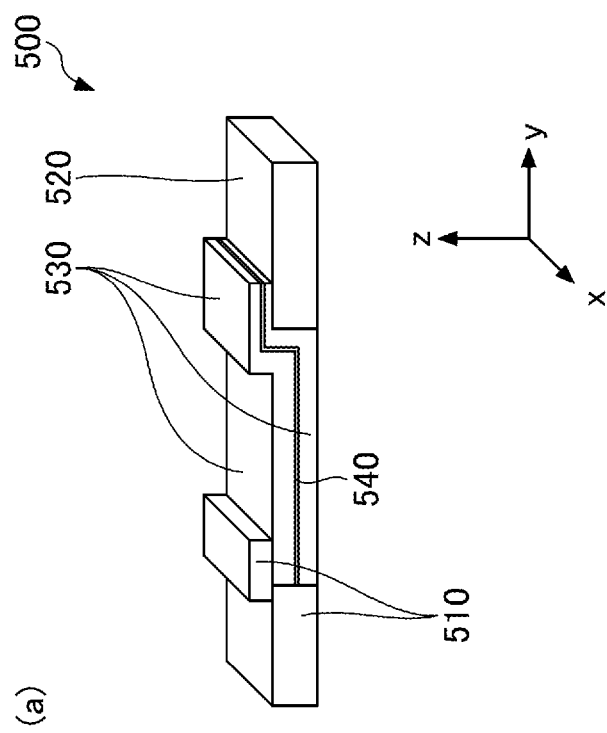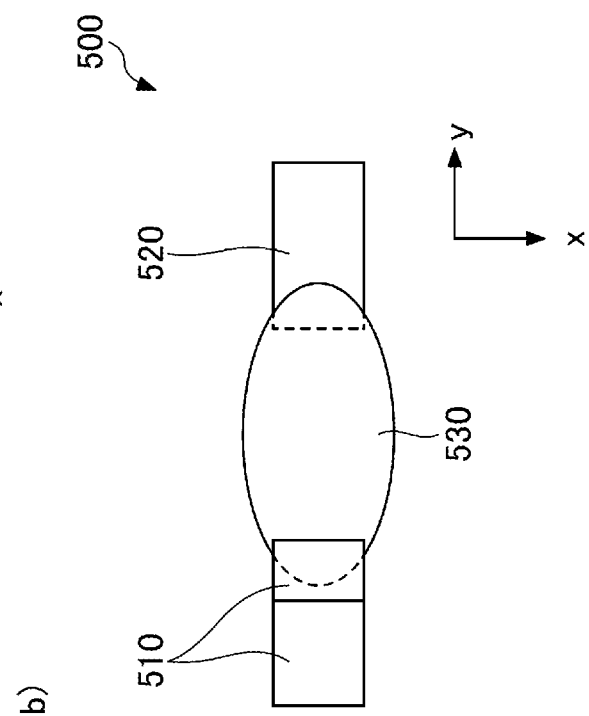
FIG.14

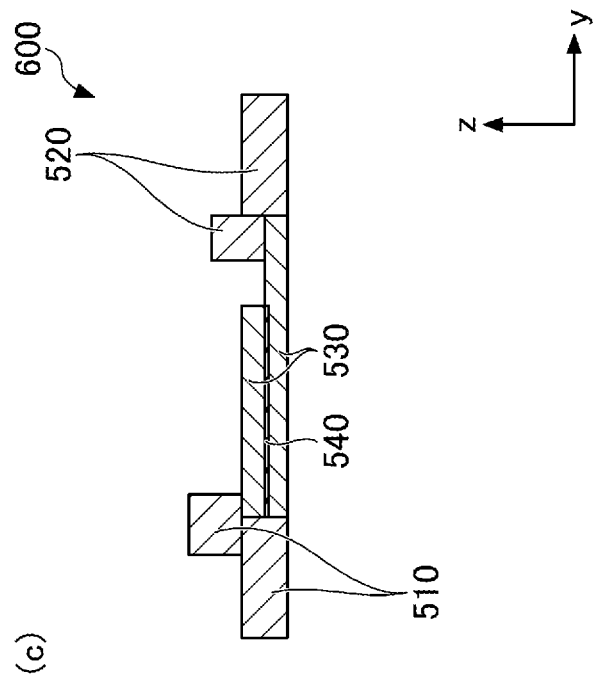
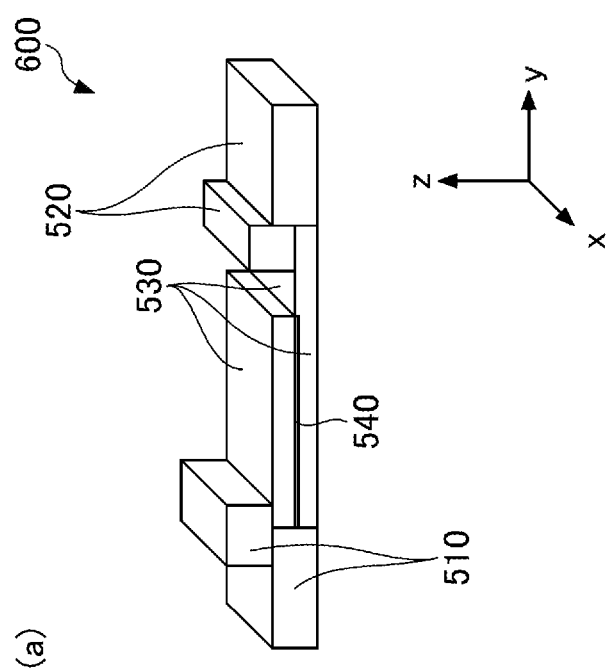
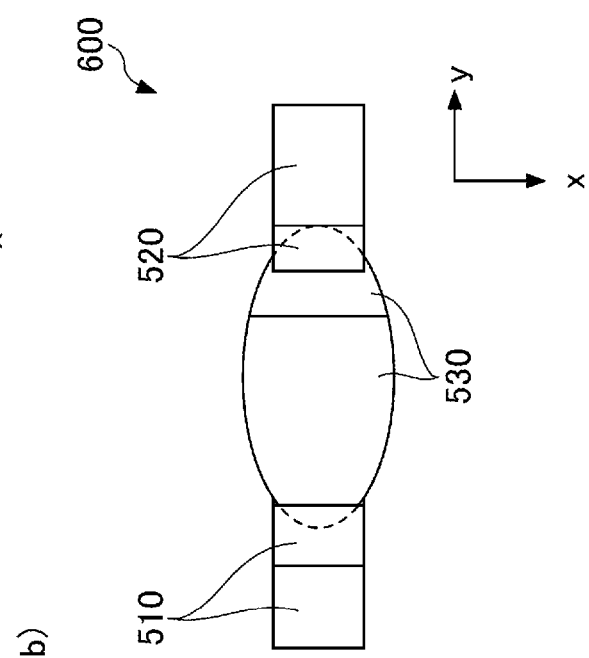
FIG.15

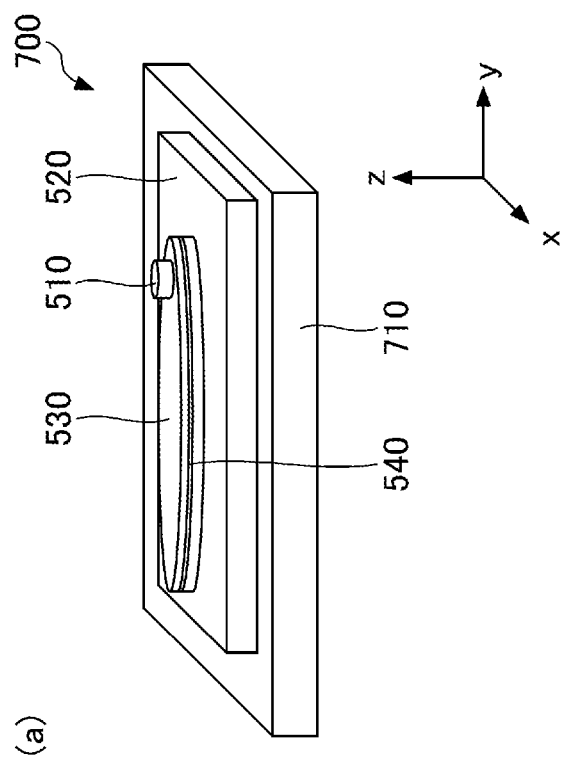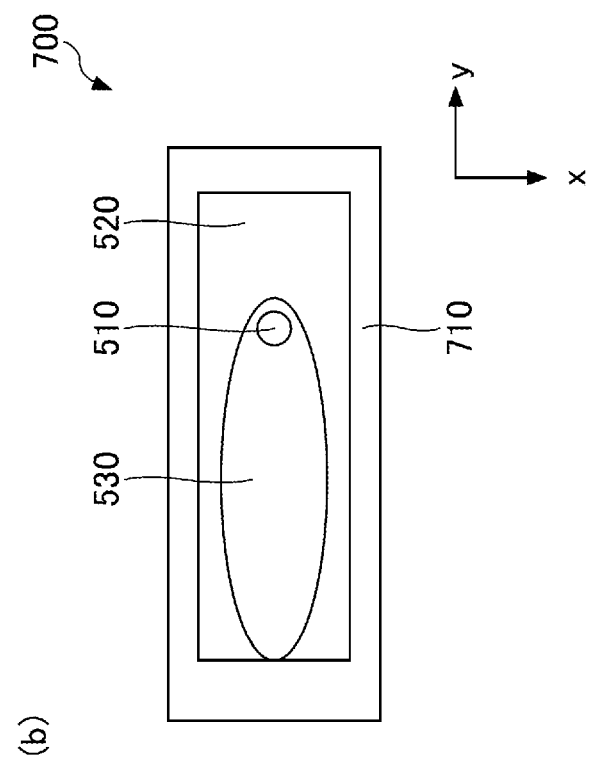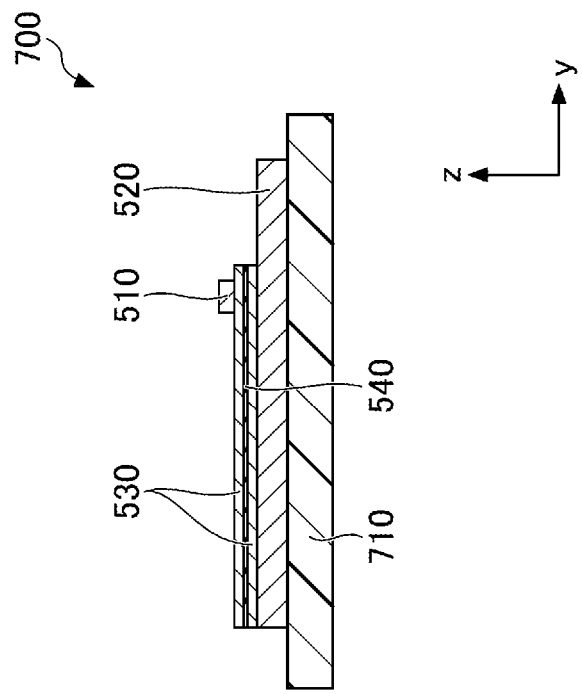
FIG.16

ROLLING BEARING

CROSS-REFERENCE TO RELATED APPLICATIONS

This application is a national stage application under 35 USC 371 of International Application No. PCT/JP2022/026531, filed on Jul. 1, 2022, which claims priority to Japanese Patent Application No. 2021-111064, filed on Jul. 2, 2021, the entire contents of which are incorporated herein by reference.

TECHNICAL FIELD

The present invention relates to a rolling bearing.

BACKGROUND

A rolling bearing is known as including an outer ring with a race on an inner peripheral side of the outer ring, an inner ring with a race on an outer peripheral side of the inner ring, rolling elements interposed between the race of the outer ring and the race of the inner ring, and strain gauges capable of being attached to the surface of the outer ring or the inner ring. The rolling bearing has two strain gauges that are attached along an axial direction of the outer ring (see Patent Document 1, for example).

RELATED-ART DOCUMENT

Patent Document

Patent Document 1: Japanese Unexamined Patent Application Publication No. 2005-249594

SUMMARY

Problem to be Solved by the Invention

However, a conventional rolling bearing cannot detect a trajectory of the rolling element when rotating.

In view of the situation described above, an object of the present invention is to provide a rolling bearing capable of detecting a trajectory of a rolling element when the rolling bearing rotates.

A rolling bearing includes an outer ring having a predetermined rotation axis; an inner ring disposed coaxially with the outer ring, and situated on an inner peripheral side of the outer ring; multiple rolling elements disposed between the outer ring and the inner ring; and a strain gauge disposed on an outer peripheral surface of the outer ring or an inner peripheral surface of the inner ring. The strain gauge includes three or more detector elements that are disposed on the outer peripheral surface of the outer ring or the inner peripheral surface of the inner ring, and the three or more detector elements include at least two detector elements at different locations in a circumferential direction of the outer ring or the inner ring, the at least two detector elements being situated at different locations in a direction of the rotation axis.

Effects of the Invention

According to a disclosed technique, a rolling bearing capable of detecting a trajectory of a rolling element when the rolling bearing rotates can be provided.

BRIEF DESCRIPTION OF DRAWINGS

FIG. 13 is a plan view and a cross-sectional view of an example of a detector element included in the strain gauge according to a second embodiment.

FIG. 14 is a perspective view, a plan view, and a cross-sectional view of an example of the detector element included in the strain gauge according to a third embodiment.

FIG. 15 is a perspective view, a plan view, and a cross-sectional view of another example of the detector element included in the strain gauge according to the third embodiment.

FIG. 16 is a perspective view, a plan view, and a cross-sectional view of still another example of the detector element included in the strain gauge according to the third embodiment.

DESCRIPTION OF EMBODIMENTS

Embodiments for carrying out the invention are described below with reference to the drawings. In each drawing, the same components are indicated by the same numerals, and accordingly, duplicate description may be omitted.

First Embodiment

[Rolling Bearing]

Figure 1:
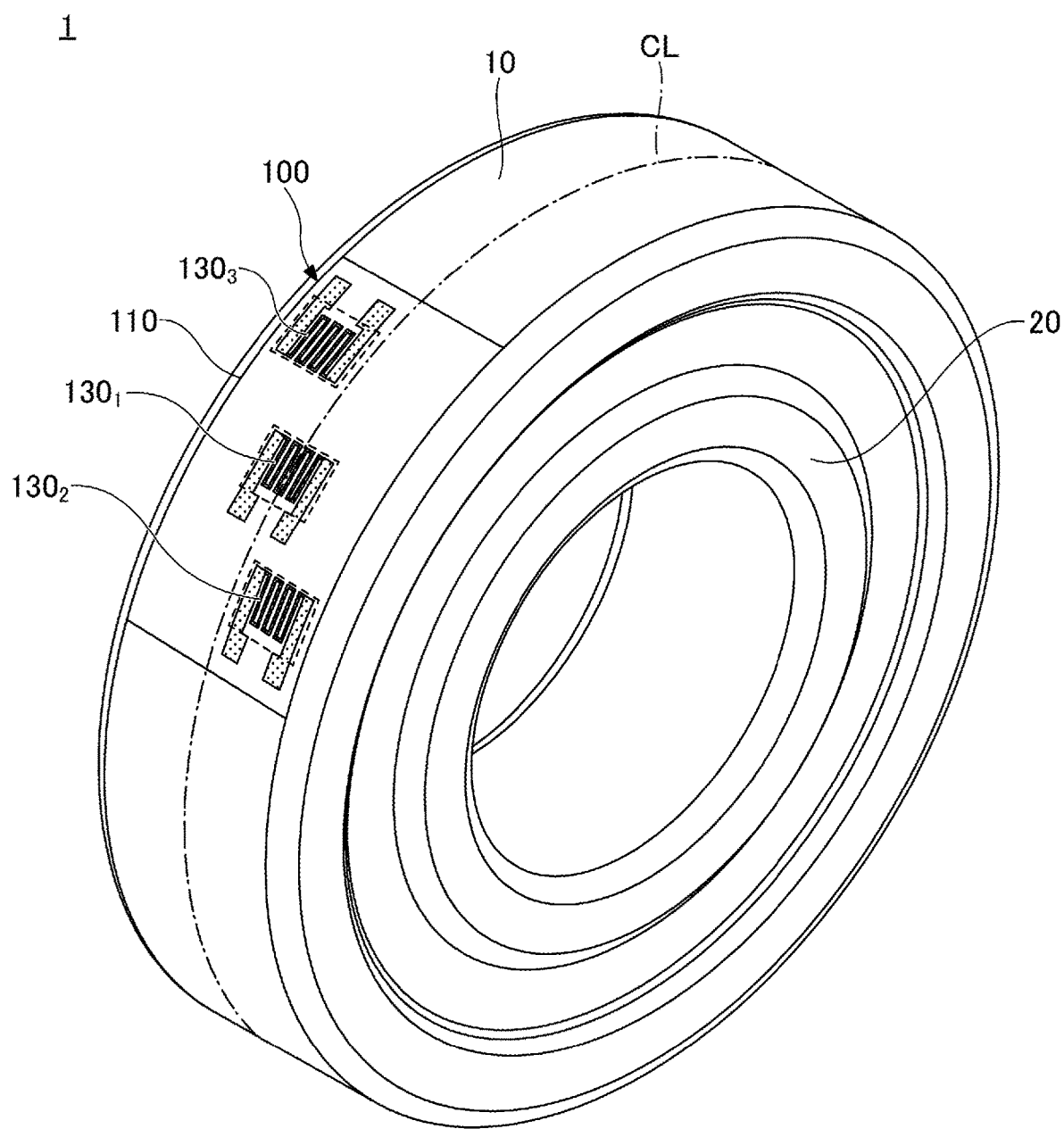
FIG. 1 is a perspective view of an example of a rolling bearing according to a first embodiment.
Figure 2:
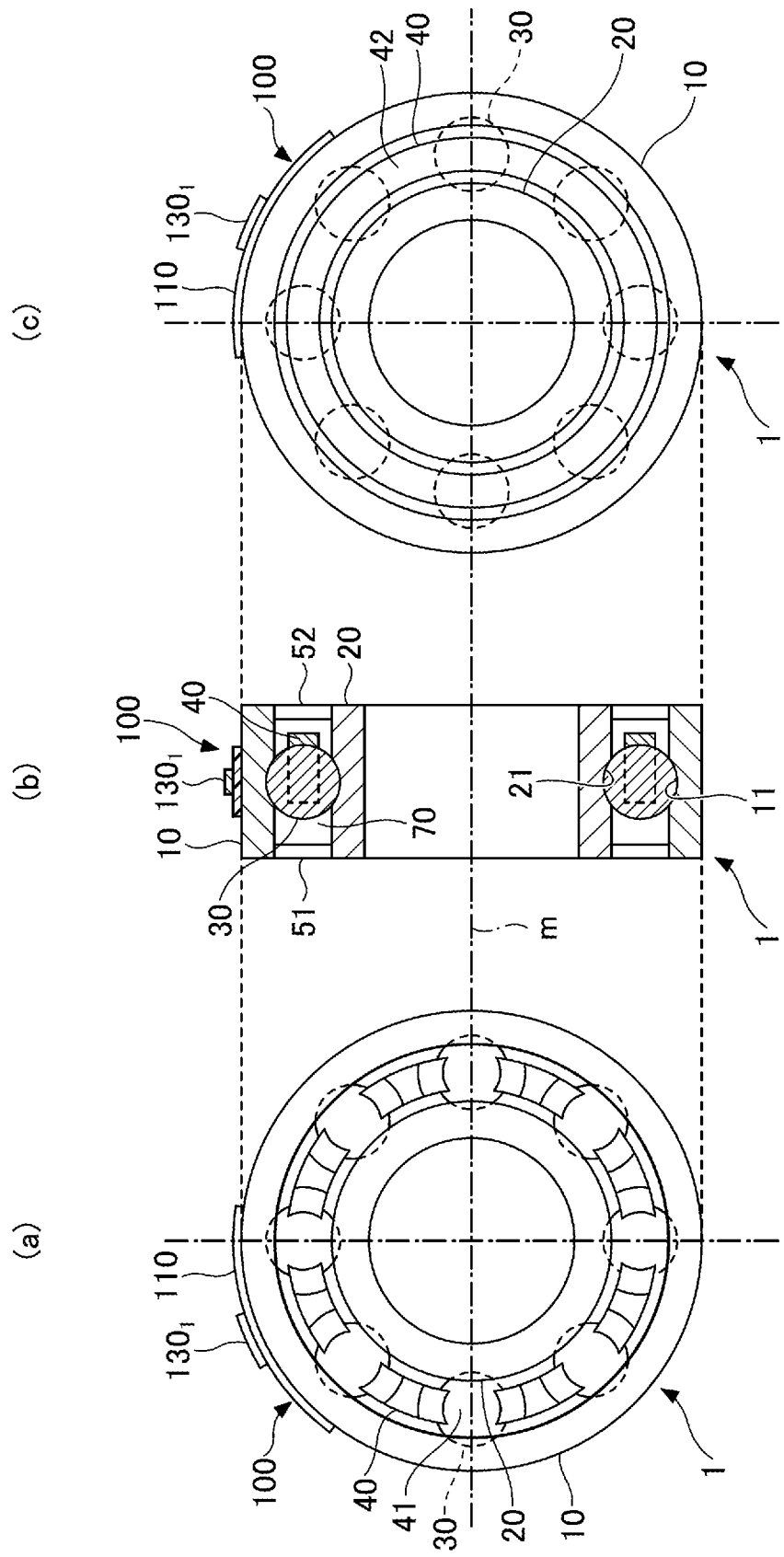
FIG. 2 is a diagram illustrating an example of the rolling bearing according to the first embodiment.

FIG. 1 is a perspective view of an example of a rolling bearing according to a first embodiment. FIG. 2 is a diagram illustrating an example of the rolling bearing according to the first embodiment. FIG. 2 (*a*) is a front view of the rolling bearing, FIG. 2 (*b*) is a cross-sectional view of the rolling bearing, and FIG. 2 (*c*) is a back view of the rolling bearing.

Referring to FIG. 1 and FIG. 2, a rolling bearing 1 includes an outer ring 10, an inner ring 20, multiple rolling elements 30, a holder 40, seals 51 and 52, and a strain gauge 100. In FIG. 2 (*a*) and FIG. 2 (*c*), illustration of seals 51 and 52 are omitted for the sake of convenience.

The outer ring 10 has a cylindrical structure of which a central axis is a rotation axis m. The inner ring 20 has a cylindrical structure that is disposed coaxially with the outer ring 10 and that is provided on an inner peripheral side of the outer ring 10. Each of the rolling elements 30 is a sphere disposed in a race 70 that is formed between the outer ring 10 and the inner ring 20. A lubricant (not illustrated) such as grease is applied to the race 70. The seals 51 and 52 protrude from the inner peripheral surface of the outer ring 10 toward the inner ring 20 to isolate the race 70 from the outside.

At the inner peripheral surface of the outer ring 10, a recess 11 of which a cross-sectional shape is an arc shape is formed in a circumferential direction of the outer ring 10. A recess 21 of which a cross-sectional shape is an arc shape is formed in a circumferential direction of the inner ring 20 and at an outer peripheral surface of the inner ring 20. The rolling elements 30 are guided in the circumferential direction by the recesses 11 and 21.

The holder 40 is disposed in the race 70, and holds the rolling elements 30. Specifically, the holder 40 is an annular portion that is disposed coaxially with the rotation axis m. One side of the holder 40 in a direction of the rotation axis m includes recesses 41 for accommodating the respective rolling elements 30, and the other side of the holder 40 includes a back portion 42 that is continuously provided in the circumferential direction of the annular portion.

Figure 3:
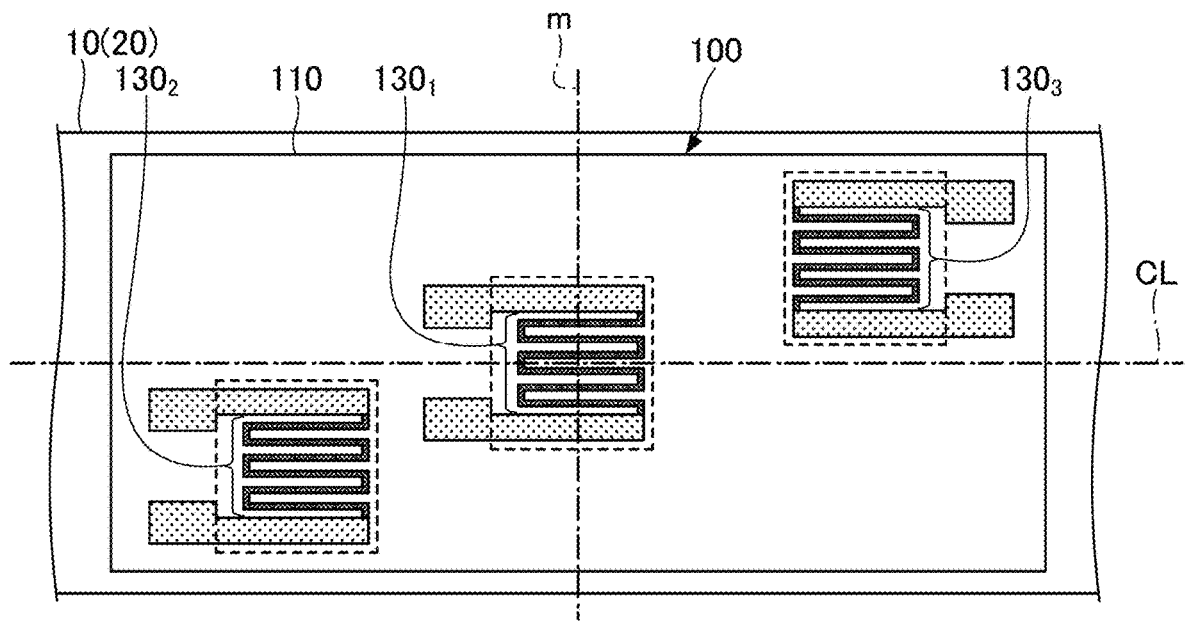
FIG. 3 is an enlarged view of an example of a proximate portion of a strain gauge in FIG. 1.

FIG. 3 is an enlarged view of an example of a proximate portion of the strain gauge in FIG. 1. The strain gauge 100 illustrated in FIGS. 1 to 3 is a sensor that detects strain in the outer ring 10 or the inner ring 20. The strain gauge 100 includes three or more detector elements. In the present embodiment, the strain gauge 100 is a resistive strain gauge that includes one or more resistors used as detector elements. The strain gauge 100 includes a first resistor $130_1$, a second resistor $130_2$, and a third resistor $130_3$, which serve as sensitive portions, on a substrate 110. In the present embodiment, the strain gauge 100 is disposed on the outer peripheral surface of the outer ring 10, and detects the strain in the outer ring 10 as changes in a resistance value of the first resistor $130_1$, the second resistor $130_2$, and the third resistor $130_2$.

In the strain gauge 100, the first resistor $130_1$, the second resistor $130_2$, and the third resistor $130_3$ are arranged such that a longitudinal direction (grid direction described below) of each of the resistors refers to a circumferential direction of the outer ring 10. The outer ring 10 is more likely to expand and contract in the circumferential direction than in the direction of the rotation axis m. Thus, in the arrangement in which the first resistor $130_1$, the second resistor $130_2$, and the third resistor $130_3$ are each arranged such that the longitudinal direction of the resistor refers to the circumferential direction of the outer ring 10. As a result, a large strain waveform can be obtained.

However, when a sufficient strain waveform can be obtained even in a case where the longitudinal direction of each of the first resistor $130_1$, the second resistor $130_2$, and the third resistor $130_3$ refers to the direction of the rotation axis m, such arrangement may be adopted.

In FIGS. 1 and 3, CL is an imaginary line that divides the outer peripheral surface of the outer ring 10 into two portions in the direction of the rotation axis m, and CL indicates a centerline of the outer peripheral surface of the outer ring 10. The first resistor $130_1$ is disposed on the centerline CL. The first resistor $130_1$ may be disposed, for example, such that a middle portion in a grid-width direction (described below) coincides with the centerline CL.

The first resistor $130_1$, the second resistor $130_2$, and the third resistor $130_3$ differ from one another in a location in the circumferential direction and a location in the direction of the rotation axis m. The second resistor $130_2$ is disposed on one side of the first resistor $130_1$ in the circumferential direction and on one side of the centerline CL in the direction of the rotation axis m. The third resistor $130_3$ is disposed on the other side of the first resistor $130_1$ in the circumferential direction and on the other side of the centerline CL in the direction of the rotation axis m. The location of each resistor refers to a position of the center of gravity of a region (hereinafter referred to as a resistor formation region) in which resistors on the substrate 110 are formed, in a plan view.

The second resistor $130_2$ and the third resistor $130_3$ are arranged to face each other in a direction oblique to the centerline CL such that the first resistor $130_1$ is interposed between the second resistor $130_2$ and the third resistor $130_3$. Here, a case where the second resistor 1302 and the third resistor $130_3$ are disposed to face each other such that the first resistor $130_1$ is interposed between the second resistor $130_2$ and the third resistor $130_3$ means that a straight line, connecting a center of gravity of a resistor formation region of the second resistor 1302 and a center of gravity of a resistor formation region of the third resistor 1303, passes through any portion of the first resistor $130_1$ in a plan view.

A distance between the first resistor $130_1$ and the second resistor $130_2$ in the circumferential direction of the outer ring 10 is equal to a distance between the first resistor $130_1$ and the third resistor $130_3$ in the circumferential direction of the outer ring 10, for example. A distance between the first resistor $130_1$ and the second resistor $130_2$ in the direction of the rotation axis m is equal to a distance between the first resistor $130_1$ and the third resistor $130_3$ in the direction of the rotation axis m, for example. A distance between resistors refers to a distance between centers of gravity of resistor formation regions for respective resistors, in a plan view.

In the strain gauge 100, the first resistor $130_1$, the second resistor $130_2$, and the third resistor $130_3$ are arranged as illustrated in FIG. 3. With this arrangement, changes in the output of the rolling elements 30 in the circumferential direction and changes in the output of the rolling elements 30 in the direction of the rotation axis m, in one cycle, can be detected. With this arrangement, the trajectory of each rolling element 30 during rotation can be detected.

Figure 4:
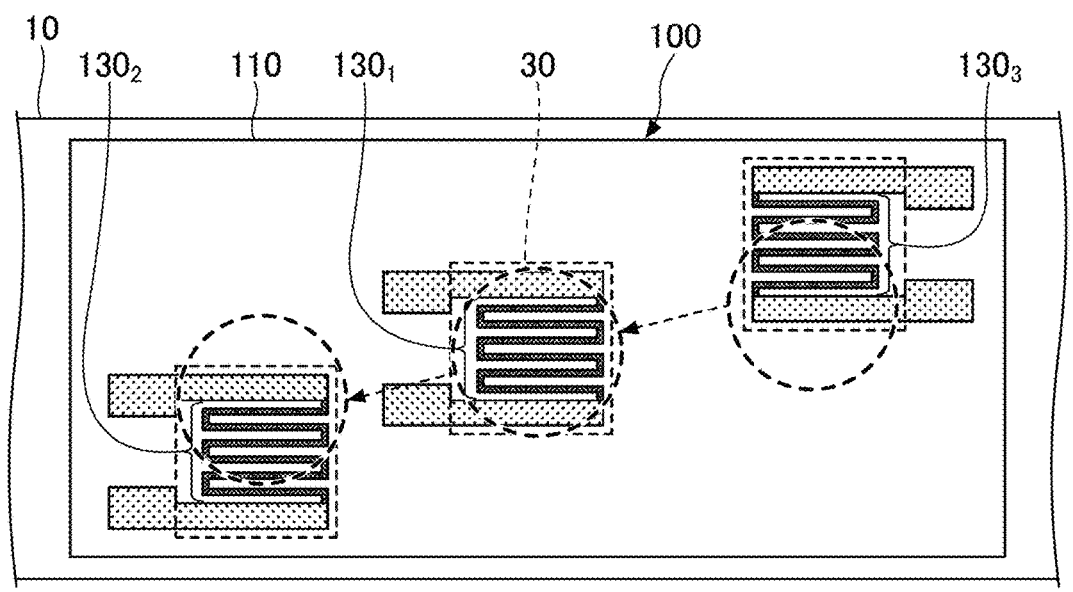
FIG. 4 is a diagram (first part) for describing detection of a trajectory of a rolling element.
Figure 5:
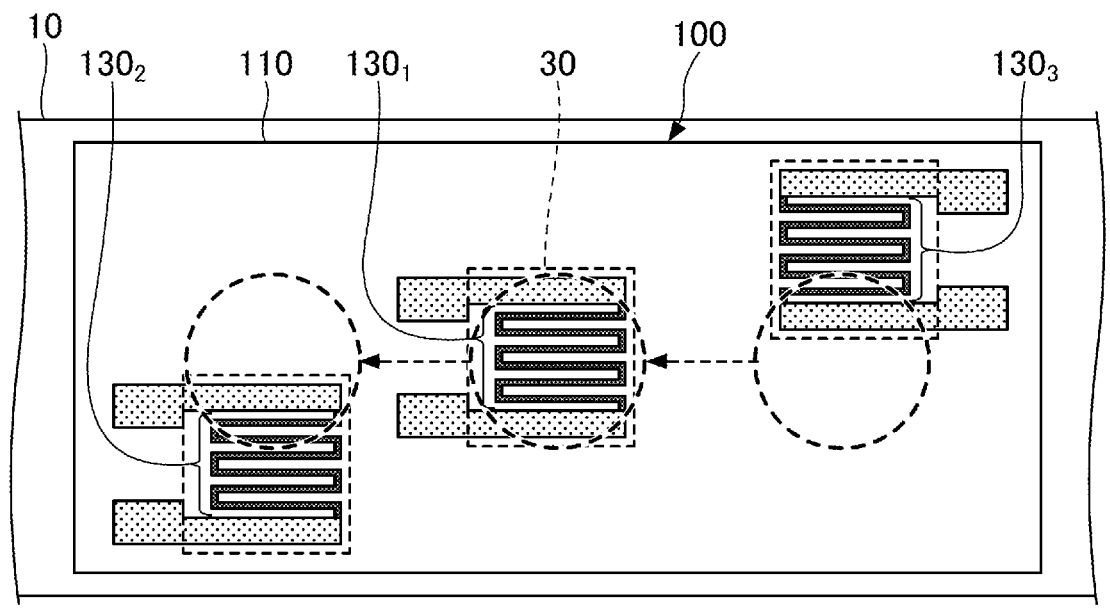
FIG. 5 is a diagram (second part) for describing detection of the trajectory of the rolling element.

For example, when trajectories as illustrated in FIGS. 4 and 5 are used, the output of the second resistor $130_2$ and the third resistor $130_3$ is smaller than the output of the first resistor $130_1$. In this arrangement, the trajectory of the rolling element 30 during rotation can be detected using a ratio of the output of the second resistor $130_2$ and the third resistor 130 to the output of the first resistor $130_1$. In the trajectory in FIG. 5, the output of the second resistor $130_2$ and the third resistor $130_3$ is smaller than the output of the first resistor $130_1$, in comparison to the trajectory in FIG. 4. Thus, both the trajectories in FIGS. 4 and 5 can be distinguished.

Figure 6:
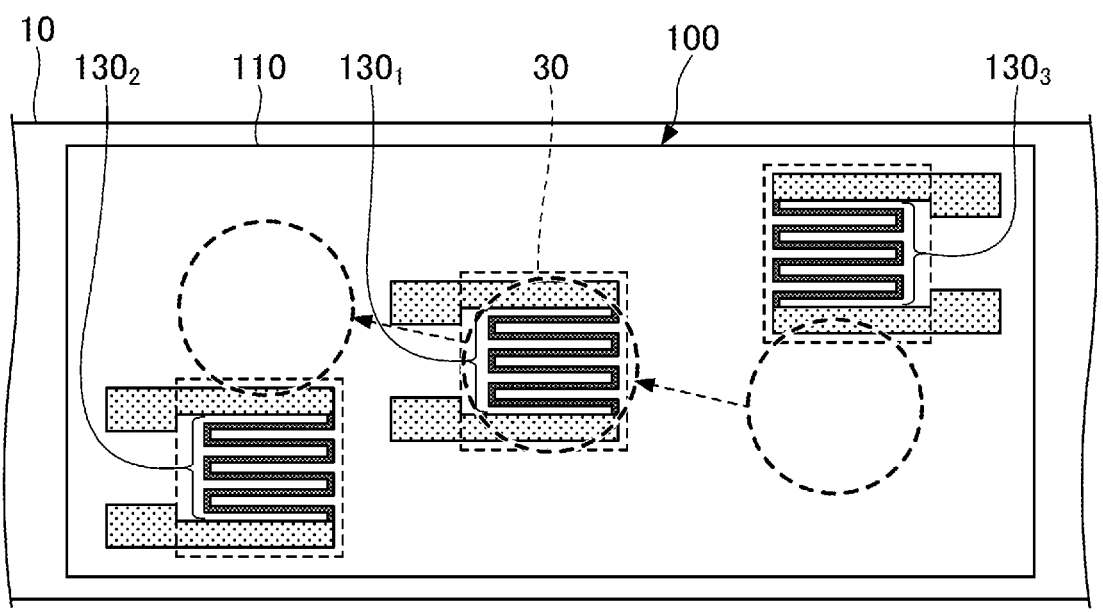
FIG. 6 is a diagram (third part) for describing detection of the trajectory of the rolling element.

When the trajectory as illustrated in FIG. 6 is used, the output of the first resistor $130_1$ is the same as that obtained in the case of FIGS. 4 and 5, while the output of the second resistor $130_2$ and the third resistor $130_3$ is approximately zero. In this case, a trajectory can be detected to be inclined in a direction opposite the direction of the trajectory obtained in FIG. 4. Further, by continuously monitoring the outputs of the first resistor $130_1$, the second resistor $130_2$, and the third resistor $130_3$, changes in the trajectory of a given rolling element 30 can be identified.

In this arrangement, in the rolling bearing 1, the trajectory of the rolling element 30 during rotation can be detected based on the output of the strain gauge 100, and thus a lifetime of the rolling bearing 1 can be predicted in consideration of the trajectory of the rolling element 30, the number of rotations and a preload of the rolling element 30. That is, a state of the rolling element 30 during rotation can be accurately identified based on the output of the strain gauge 100, and thus the lifetime can be predicted with higher accuracy. Further, the remaining lifetime can be diagnosed for various products that use the rolling bearing 1. In particular, when a Cr composite film described below is used for each resistor, the Cr composite film has a gauge factor of 10 or more and high sensitivity, thereby allowing for detection of a small displacement. Therefore, the trajectory of the rolling element 30 can be detected with high accuracy.

Hereinafter, the strain gauge 100 is described in detail. When it is not necessary to distinguish the first resistor 130₁, the second resistor 130₂, and the third resistor 130₃ from one another, these resistors may be collectively referred to as resistors 130.

Figure 7:
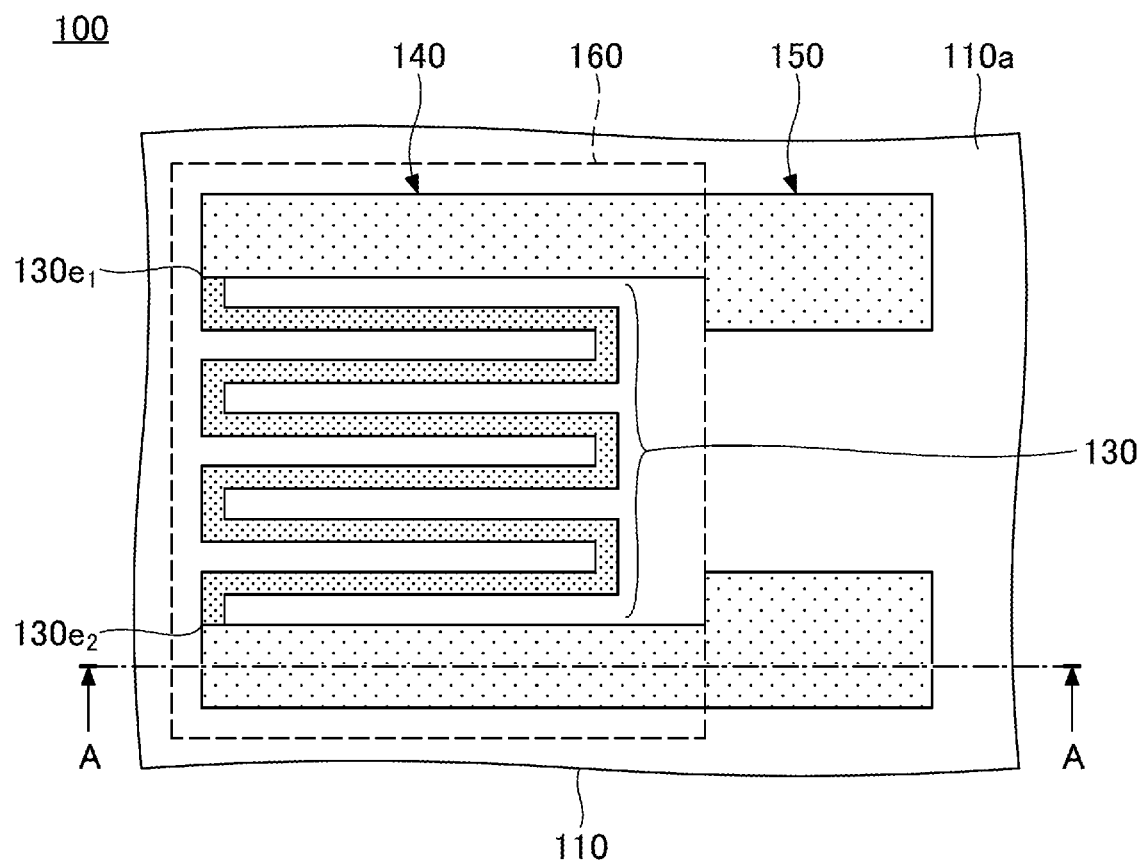
FIG. 7 is a plan view of a proximate portion of one resistor in the strain gauge according to the first embodiment.
Figure 8:
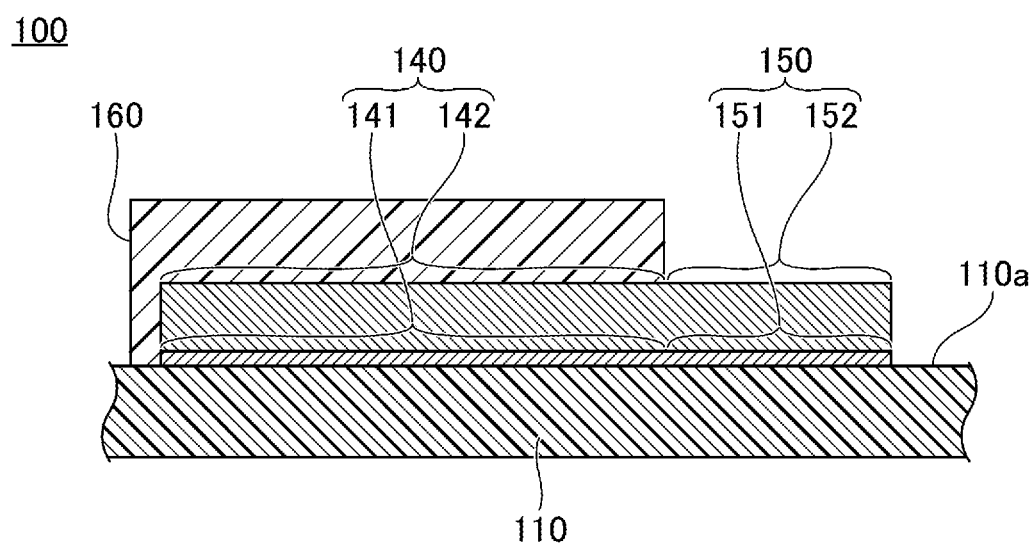
FIG. 8 is a cross-sectional view of the proximate portion of one resistor in the strain gauge according to the first embodiment.

FIG. 7 is a plan view of a proximate portion of one resistor of the strain gauge according to the first embodiment. FIG. 8 is a cross-sectional view of the proximate portion of one resistor of the strain gauge according to the first embodiment, and illustrates the cross section along the line A-A in FIG. 7. Referring to FIGS. 3, 7, and 8, the strain gauge 100 includes three sets each of which includes the resistor 130, lines 140, electrodes 150, and the cover layer 160, and these sets are disposed on one substrate 110. However, unlike in FIG. 3, three strain gauges each of which has one set in which the resistor 130, lines 140, electrodes 150, and the cover layer 160 are situated on one substrate 110 may be disposed on the outer peripheral surface of the outer ring 10. In FIG. 7, only the outer edge of the cover layer 160 is expressed by a broken line for convenience. The cover layer 160 may be provided as necessary.

In FIG. 7 and FIG. 8, for the sake of convenience, in the strain gauge 100, the side of the substrate 110 where the resistors 130 are provided is referred to as an upper side or one side, and the side of the substrate 101 where the resistors 130 are not provided is referred to as a lower side or the other side. Further, for each component, the surface on the side where the resistors 130 are provided is referred to as one surface or an upper surface, and the surface on the side where the resistors 130 are not provided is referred to as the other surface or a lower surface. However, the strain gauge 100 can be used in a state of being upside down, or can be disposed at any angle. Further, a plan view means that an object is viewed from a direction normal to an upper surface 110a of the substrate 110, and a planar shape refers to a shape of an object when viewed from the direction normal to the upper surface 110a of the substrate 110.

The substrate 110 is a member that is a base layer for forming the resistors 130 or the like, and is flexible. The thickness of the substrate 110 is not particularly restricted, and can be appropriately selected for any purpose. For example, such a thickness can be approximately from 5 μm to 500 μm. In particular, when the thickness of the substrate 110 is from 5 μm to 200 μm, it is preferable in terms of strain transfer from a flexure element surface that is bonded to a lower surface of the substrate 110 via an adhesive layer or the like, and dimensional stability with respect to environment, and when the thickness is 10 μm or more, it is further preferable in terms of insulation.

The substrate 110 can be formed of an insulating resin film such as a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a liquid crystal polymer (LCP), or a polyolefin resin. The film refers to a flexible member having a thickness of about 500 μm or less.

Here, the "formed of an insulating resin film" is not intended to preclude the substrate 110 from containing fillers, impurities, or the like in the insulating resin film. The substrate 110 may be formed, for example, of an insulating resin film containing fillers such as silica or alumina.

Examples of the material of the substrate 110 other than the resin include crystal materials such as $SiO_2$, $ZrO_2$ (including YSZ), Si, $Si_2N_3$, $Al_2O_3$ (including sapphire), ZnO, and perovskite-based ceramics ($CaTiO_3$, $BaTiO_3$), and the examples further include amorphous glass or the like. Also, a metal such as aluminum, an aluminum alloy (duralumin), or titanium may be used as the material of the substrate 110. In this case, for example, an insulating film is formed on the substrate 110 made of the metal.

The resistor 130 is a thin film that is formed in a predetermined pattern and on the substrate 110. The resistor 130 is a sensitive portion where the resistance varies in accordance with strain. The resistor 130 may be formed directly on the upper surface 110a of the substrate 110, or may be formed above the upper surface 110a of the substrate 110 via one or more other layers. In FIG. 7, for the sake of convenience, the resistor 130 is illustrated in a dense crepe pattern.

The resistor 130 has a structure in which multiple elongated portions, of which longitudinal directions are the same direction (direction defined by the line A-A in FIG. 7 (circumferential direction)), are arranged at predetermined intervals, and in which ends of adjacent elongated portions are alternately coupled to each other, so that the resistor 130 extends with a back-and-forth zigzagging pattern as a whole. The longitudinal direction of the elongated portions refers to the grid direction, and a direction perpendicular to the grid direction refers to the grid-width direction (direction perpendicular to the line A-A (direction of the rotation axis m) in FIG. 7).

For each of two elongated portions disposed on an outermost side in the grid-width direction, one end of the elongated portion in the longitudinal direction is bent in the grid-width direction to form a corresponding end among an end 130e₁ and an end 130e₂ of the resistor 130 in the grid-width direction. The ends 130e₁ and 130e₂ of the resistor 130 in the grid-width direction are electrically coupled to the electrodes 150 via the lines 140, respectively. In other words, the lines 140 electrically connect the ends 130e₁ and 130e₂ of the resistor 130 in the grid-width direction to the electrodes 150, respectively.

The resistor 130 can be each formed, for example, of material including Cr (chromium), material including Ni (nickel), or material including both of Cr and Ni. In other words, the resistor 130 can be formed of material including at least one of Cr or Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, and $Cr_2N$, and the like. The Cr composite film may include incidental impurities such as chromium oxide.

The thickness of the resistor 130 is not particularly restricted, and can be appropriately selected for any purpose. The thickness can be, for example, approximately from 0.05 μm to 2 μm. In particular, when the thickness of the resistor 130 is 0.1 μm or more, it is preferable in terms of increases in crystallinity (e.g., crystallinity of α-Cr) of a crystal that constitutes the resistor 130. When the thickness of the resistor 130 is 1 μm or less, it is further preferable in terms of reductions in cracks of a given film caused by internal stress of the film that constitutes the resistor 130, or reductions in warp in the substrate 110. The width of the resistor 130 is optimized based on required specifications of a resistance value and lateral sensitivity and the like, and the resulting width can be approximately from 10 μm to 100 μm in consideration of addressing disconnections.

For example, when the resistor 130 is the Cr composite film, in a case where the resistor 130 is formed with α-Cr (alpha-chromium) that has a stable crystalline phase and is used as a main component, stability of gauge characteristics can be increased. Also, by forming the resistor 130 with α-Cr as the main component, the gauge factor of the strain gauge 100 can be 10 or more, and a gauge factor temperature coefficient TCS and temperature coefficient of resistance TCR can be each in the range of −1,000 ppm/° C. to +1,000 ppm/° C. Here, a main component means that a target substance is at 50% s by weight or more of total substances that constitute the resistor. The resistor 130 preferably includes α-Cr at 80% by weight or more, or more preferably at 90% by weight or more, from the viewpoint of increasing the gauge characteristics. Note that α-Cr is Cr having a bcc structure (body-centered cubic structure).

When the resistor 130 is the Cr composite film, CrN and $Cr_2N$ included in the Cr composite film are preferably at 20% by weight or less. When CrN and $Cr_2N$ included in the Cr composite film are at 20% by weight or less, reductions in the gauge factor can be suppressed.

A percentage of $Cr_2N$ in the CrN and $Cr_2N$ is preferably greater than or equal to 80% and less than 90%, and more preferably greater than or equal to 90% and less than 95%. When the percentage of $Cr_2N$ in the CrN and $Cr_2N$ is greater than or equal to 90% and less than 95%, TCR (negative TCR) is further reduced significantly by $Cr_2N$ having a semiconductor characteristic. Further, with reductions in making of ceramics, brittle fracture is reduced.

When a small amount of $N_2$ or atomic N, which is mixed into a given film, is present, an external environment (e.g., in a high temperature environment) causes the $N_2$ or the N to escape from the given film, thereby resulting in changes in film stress. By creating chemically stable CrN, a stable strain gauge can be obtained without forming the unstable N.

The lines 140 are formed on the substrate 110, and are electrically coupled to the resistor 130 and the electrodes 150. Each line 140 includes a first metal layer 141 and a second metal layer 142 that is laminated on the upper surface of the first metal layer 141. The linear shape of the line 140 is not restricted, and the line 140 can have any pattern. The line 140 can have any width and length. In FIG. 7, for the sake of convenience, the line 140 and the electrodes 150 are each illustrated in a sparse crepe pattern, compared to the resistor 130.

Each electrode 150 is formed on the substrate 110, and is electrically coupled to the resistor 130 through the line 140. For example, the electrode 150 is wider than the line 140 to have an approximately rectangular shape. The electrodes 150 are a pair of electrodes through which changes in the resistance value of the resistor 130 in accordance with strain are externally output. For example, lead wires for external connection are bonded to the electrodes.

The electrodes 150 include a pair of first metal layers 151, and include second metal layers 152 that are respectively laminated on upper surfaces of the first metal layers 151 in the pair. The first metal layer 151 is electrically coupled, at respective ends, to ends $130e_1$, and $130e_2$ of the resistor 130 via the first metal layer 141 of the line 140. The first metal layer 151 is formed to have an approximately rectangular shape in a plan view. The first metal layer 151 may be formed to have the same width as that of the line 140.

Although the resistor 130, the first metal layer 141, and the first metal layer 151 are expressed by different numerals for the sake of convenience, these components can be integrally formed of the same material in the same process. With this approach, for the resistor 130, the first metal layer 141, and the first metal layer 151, these thicknesses are approximately identical. Further, the second metal layer 142 and the second metal layer 152 are expressed by different numerals for the sake of convenience, but these layers can be integrally formed of the same material in the same process. With this approach, for the second metal layer 142 and the second metal layer 152, the thicknesses are approximately identical.

The second metal layers 142 and 152 are formed of a material having a resistance lower than that of the resistor 130 (the first metal layers 141 and 151). The material of the second metal layers 142 and 152 is not particularly restricted, and may be appropriately selected for any purpose, so long as the material has a lower resistance than the resistor 130. For example, when the resistor 130 is the Cr composite film, examples of the material of the second metal layers 142 and 152 include Cu, Ni, Al, Ag, Au, Pt, or the like; an alloy of any metals of these metals; a compound of any of these metals; or a laminated film that is obtained by appropriately laminating any metals of these metals, alloys, and compounds. The thickness of each of the second metal layers 142 and 152 is not particularly restricted, and can be appropriately selected for any purpose. For example, the thickness of each of the second metal layers 142 and 152 can be approximately 3 μm to 5 μm.

The second metal layers 142 and 152 may be respectively formed on portions of the upper surfaces of the first metal layers 141 and 151, or may be respectively formed on the entire upper surfaces of the first metal layers 141 and 151. Any other metal layer(s) may be further laminated on the upper surface of the second metal layer 152. For example, the second metal layer 152 may be a copper layer, and a gold layer may be laminated on the upper surface of the copper layer. Alternatively, the second metal layer 152 may be a copper layer, and a palladium layer and a gold layer may be sequentially laminated on and above the upper surface of the copper layer. By forming an uppermost layer of the electrode 150 as the cold layer, solder wettability of the electrodes 150 can be improved.

As described above, the line 140 has a structure in which the second metal layer 142 is laminated on the first metal layer 141 that is made of the same material as the resistor 130. With this arrangement, the line 140 has a lower resistance than the resistor 130, and thus the line 140 can be prevented from functioning as a resistor. As a result, accuracy in detecting the strain by the resistor 130 can be increased.

In other words, by providing the line 140 having a lower resistance than the resistor 130, a substantial sensitive portion of the strain gauge 100 can be limited to a local region where the resistor 130 is formed. In this arrangement, accuracy in detecting the strain by the resistor 130 can be increased.

In particular, in a high sensitivity strain gauge that has a gauge factor of 10 or more and that uses a Cr composite film as each resistor 130, when the resistance of each line 140 is set to be lower than the resistance of the resistor 130, and a given sensitive portion is limited to the local region where one or more resistors 130 are formed, remarkable effects on improvement in detection accuracy of the strain are obtained. Further, by providing the line 140 with a lower resistance than the resistor 130, effects of reducing the lateral sensitivity are obtained.

A pattern for drawn lines 140 and locations of the electrodes 150 can be set as appropriate. For example, the electrodes 150 coupled to respective resistors may be aligned to be situated at respective predetermined locations.

The cover layer 160 is formed on and above the substrate 110 such that the resistor 130 and the lines 140 are coated and the electrodes 150 are exposed. A portion of each line 140 may be exposed from the cover layer 160. By providing the cover layer 160 with which the resistor 130 and the lines 140 are coated, mechanical damage and the like can be prevented from occurring in the resistor 130 and the lines 140. In addition, by providing the cover layer 160, the resistor 130 and the lines 140 can be protected against moisture and the like. The cover layer 160 may be provided to cover all portions except for the electrodes 150.

The cover layer 160 can be formed of an insulating resin such as a PI resin, an epoxy resin, a PEEK resin, a PEN resin, a PET resin, or a PPS resin, a composite resin (e.g., a silicone resin or a polyolefin resin). The cover layer 160 may contain fillers or pigments. The thickness of the cover layer 160 is not particularly restricted and can be appropriately selected for any purpose. For example, the thickness can be approximately from 2 μm to 30 μm.

In order to manufacture the strain gauge 100, the substrate 110 is fist prepared, and then a metal layer (hereinafter referred to as a metal layer A for the sake of convenience) is formed on the upper surface 110a of the substrate 110. Finally, the metal layer A is patterned to become a layer that forms the resistor 130, the first metal layer 141, and the first metal layer 151. The material and the thickness of the metal layer A are set as in the material and the thickness for the resistor 130, the first metal layer 141, and the first metal layer 151.

The metal layer A can be formed, for example, by magnetron sputtering that uses a raw material capable of forming the metal layer A as a target. The metal layer A may be formed by reactive sputtering, vapor deposition, arc ion plating, pulse laser deposition, or the like, instead of using the magnetron sputtering.

From the viewpoint of stabilizing a gauge characteristic, preferably, a functional layer having a predetermined film thickness is vacuum-deposited as a base layer on the upper surface 110a of the substrate 110, for example, by conventional sputtering, before the metal layer A is formed.

In the present application, the functional layer refers to a layer that has a function of promoting crystal growth of the metal layer A (resistor 130) that is at least an upper layer. The functional layer preferably further has a function of preventing oxidation of the resistors caused by oxygen and moisture included in the substrate 110, as well as a function of improving adhesion between the substrate 110 and the metal layer A. The functional layer may further have any other functions.

The insulating resin film that constitutes the substrate 110 contains oxygen and moisture. In this regard, particularly when the metal layer A includes Cr, it is effective for the functional layer to have a function of preventing oxidation of the metal layer A, because Cr forms an autoxidized film.

The material of the functional layer is not particularly restricted as long as it is material having a function of promoting crystal growth of the metal layer A (resistor 130) that is at least an upper layer. Such material can be appropriately selected for any purpose, and includes one or more types of metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed of a conductive material such as a metal or an alloy, the film thickness of the functional layer is preferably 1/20 or less of the film thickness of the resistor. When the thickness is in such a range, crystal growth of α-Cr can be promoted. Also, a portion of the current through the resistor can be prevented from flowing through the functional layer to reduce detection sensitivity of the strain.

When the functional layer is formed of a conductive material such as a metal or an alloy, the film thickness of the functional layer is more preferably 1/50 or less of the film thickness of the resistor. When the thickness is in such a range, crystal growth of α-Cr can be promoted, and a portion of the current through the resistor can be prevented from flowing through the functional layer to further prevent the detection sensitivity of strain from being reduced.

When the functional layer is formed of a conductive material such as a metal or an alloy, the film thickness of the functional layer is more preferably 1/100 or less of the film thickness of the resistor. When the thickness is in such a range, reductions in the detection sensitivity of the strain due to a portion of the current through the resistor flowing through the functional layer can be further prevented.

When the functional layer is formed of an insulating material such as an oxide or a nitride, the film thickness of the functional layer is preferably from 1 nm to 1 μm. When the thickness is in such a range, the crystal growth of α-Cr can be promoted, and the film can be easily formed without causing any cracks in the functional layer.

When the functional layer is formed of an insulating material such as an oxide and a nitride, the film thickness of the functional layer is more preferably from 1 nm to 0.8 μm. When the thickness is in such a range, the crystal growth of α-Cr can be promoted, and the film can be more easily formed without causing any cracks in the functional layer.

When the functional layer is formed of an insulating material such as an oxide and a nitride, the film thickness of the functional layer is more preferably from 1 nm to 0.5 μm. When the thickness is in such a range, the crystal growth of α-Cr can be promoted, and the functional layer can be more easily formed without causing any cracks in the functional layer.

A planar shape of the functional layer is patterned to be approximately as same as a planar shape of the resistor illustrated in FIG. 7, for example. However, the planar shape of the functional layer is not limited to a case where it is approximately the same as the planar shape of the resistor. When the functional layer is formed of an insulating material, the functional layer may not be patterned to have the same shape as the planar shape of the resistor. In this case, the functional layer may be formed in a solid state in at least a region where the resistor is formed. Alternatively, the functional layer may be formed in a solid manner on the entire upper surface of the substrate 110.

In addition, when the functional layer is formed of the insulating material, the functional layer is formed relatively thick to be greater than or equal to 50 nm and less than or equal to 1 µm, and is formed in the solid manner. Thus, the thickness and the surface area of the functional layer are increased. Therefore, heat generated by the resistor can be dissipated toward the substrate 110. As a result, in the strain gauge 100, reductions in measurement accuracy due to the self-heating of the resistor can be suppressed.

The functional layer can be vacuum-deposited, for example, by conventional sputtering in which a raw material capable of forming the functional layer is used as a target and an Ar (argon) gas is introduced into a chamber. By using the conventional sputtering, the functional layer is deposited while the upper surface 110a of the substrate 110 is etched with Ar. With this approach, the effect of improving adhesion can be obtained by minimizing an amount of the functional layer that is deposited.

However, this is an example of a method for depositing the functional layer, and the functional layer may be vacuum-deposited by another method. For example, a method may be used in which the upper surface 110a of the substrate 110 is activated by plasma treatment that uses Ar or the like before the formation of the functional layer to obtain the effect of improving adhesion, and in which then the functional layer is vacuum-deposited by magnetron sputtering.

A combination of the material of the functional layer and the material of the metal layer A is not particularly restricted, and can be appropriately selected for any purpose. For example, Ti is used as the functional layer, and a Cr composite film that is formed with α-Cr (alpha chromium) as the main component can be deposited as the metal layer A.

In this case, for example, the metal layer A can be deposited by magnetron sputtering in which a raw material capable of forming the Cr composite film is used as a target, and in which Ar gas is introduced into a chamber. Alternatively, the metal layer A may be deposited by reactive sputtering in which pure Cr is used as a target, and in which an appropriate amount of nitrogen gas, together with an Ar gas, is introduced into the chamber. In this case, a percentage of CrN and $Cr_2N$ contained in the Cr composite film, and a percentage of $Cr_2N$ in CrN and $Cr_2N$ can be adjusted by changing an introduced amount or pressure (partial pressure of nitrogen gas), or by providing a heating step to adjust a heating temperature.

In these methods, a growth face of the Cr composite film is defined by the functional layer made of Ti, and thus the Cr composite film containing α-Cr as the main component that has a stable crystal structure can be deposited. In addition, Ti constituting the functional layer diffuses into the Cr composite film, thereby improving the gauge characteristic. For example, the gauge factor of the strain gauge 100 can be set to 10 or more, and each of the gauge factor temperature coefficient TCS and the resistance temperature coefficient of resistance TCR can be set to be within the range of −1,000 ppm/° C. to +1,000 ppm/° C. When the functional layer is formed of Ti, the Cr composite film may contain Ti or TiN (titanium nitride).

When the metal layer A is a Cr composite film, the functional layer made of Ti has all functions of a function of promoting crystal growth of the metal layer A, a function of preventing oxidation of the metal layer A due to oxygen or moisture that is contained in the substrate 110, and a function of improving adhesion between the substrate 110 and the metal layer A. The same functions as described above are implemented in a case where instead of Ti, Ta, Si, Al, or Fe is used as the functional layer.

In this arrangement, by providing the functional layer under the metal layer A, the crystal growth of the metal layer A can be promoted, and the metal layer A having the stable crystal phase can be produced. As a result, stability of the gauge characteristic can be improved in the strain gauge 100. In addition, a given material that constitutes the functional layer diffuses into the metal layer A, and thus the gauge characteristic of the strain gauge 100 can be improved.

Then, the second metal layer 142 and the second metal layer 152 are formed on the upper surface of the metal layer A. The second metal layer 142 and the second metal layer 152 can be formed, for example, by photolithography.

Specifically, a seed layer is first formed, for example, by sputtering or electroless plating so as to cover the upper surface of the metal layer A. Next, a photosensitive resist is formed on the entire upper surface of the seed layer, and the photosensitive resist is exposed and developed to form an opening through which a region where the second metal layer 142 and the second metal layer 152 are to be exposed. At this time, a pattern of the second metal layer 142 can be formed to have any shape, by adjusting the shape of the opening of the resist. As the resist, for example, a dry film resist or the like can be used.

Then, for example, by electrolytic plating that uses the seed layer as a power-feeding path, the second metal layer 142 and the second metal layer 152 are formed on the seed layer exposed in the opening. The electrolytic plating is suitable in that high tact is obtained and an electrolytic plating layer with low stress can be formed as each of the second metal layer 142 and the second metal layer 152. By setting the electrolytic plating layer with a great film thickness to have low stress, the strain gauge 100 can be prevented from being warped. The second metal layer 142 and the second metal layer 152 may be formed by electroless plating.

Then, the resist is removed. The resist can be removed, for example, by immersing the substrate in a solution capable of dissolving the material of the resist.

Then, a photosensitive resist is formed on the entire upper surface of the seed layer, and the photosensitive resist is exposed and developed to be patterned to have the same planar shape as the resistor 130, the lines 140, and the electrodes 150 in FIG. 7. As the resist, for example, a dry film resist or the like can be used. Then, the resist is used as an etching mask to remove the metal layer A and the seed layer that are exposed from the resist. As a result, the resistor 130, the lines 140, and the electrodes 150 as illustrated in the planar shape in FIG. 7 are formed.

An unnecessary portion of the metal layer A and the seed layer can be removed, for example, by wet etching. When the functional layer is formed under the metal layer A, the functional layer is patterned to have the planar shape illustrated in FIG. 7 by etching, as in the resistor 130, the line 140, and the electrodes 150. At this point, the seed layer is formed on the resistor 130, the first metal layer 141, and the first metal layer 151.

Then, the second metal layer 142 and the second metal layer 152 are used as etching masks to remove an unnecessary seed layer that is exposed from the second metal layer 142 and the second metal layer 152, thereby forming the second metal layer 142 and the second metal layer 152. The seed layer that is immediately below the second metal layer 142 and the second metal layer 152 remains. For example, an unnecessary seed layer can be removed by wet etching that uses an etchant with which the seed layer is etched but the functional layer, the resistor 130, the lines 140, and the electrodes 150 are not etched.

Thereafter, as necessary, the cover layer 160 with which the resistor 130 and the lines 140 are coated and through which the electrodes 150 are exposed is provided on and above the upper surface 110a of the substrate 110. As a result, the strain gauge 100 is completed. The cover layer 160 can be formed, for example, by laminating a semi-cured insulating film on the upper surface 110a of the substrate 110 so as to cover the resistor 130 and the line 140 and expose the electrodes 150, and by heating and curing the insulating film. The cover layer 160 may be formed by applying a liquid or paste heat-curable insulating material to the upper surface 110a of the substrate 110 so as to cover the resistor 130 and the lines 140 and to expose the electrodes 150, and by heating and curing the insulating material.

First Modification of First Embodiment

In a first modification of the first embodiment, an example of the strain gauge in which the arrangement of the resistors is different from that described in the first embodiment is illustrated. In the first modification of the first embodiment, description for the same components as those described in the above embodiments may not be omitted.

Figure 9:
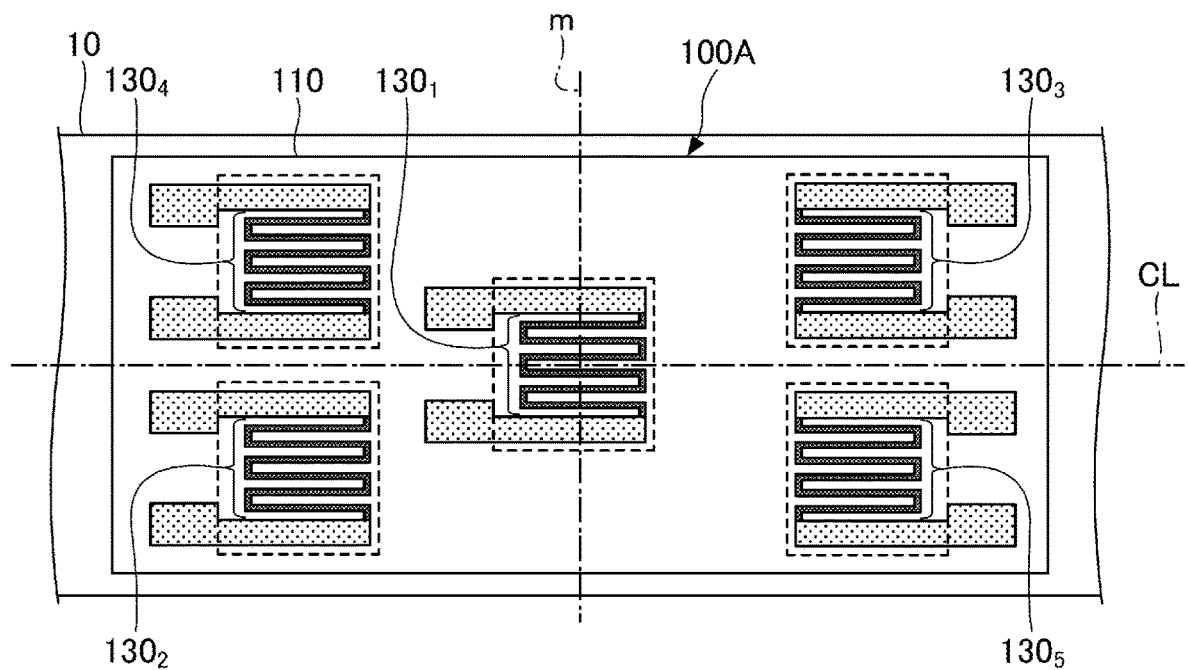
FIG. 9 is an enlarged view of the proximate portion of the strain gauge in a first modification of the first embodiment.

FIG. 9 is an enlarged view of the proximate portion of the strain gauge in the first modification of the first embodiment. Referring to FIG. 9, a strain gauge 100A differs from the strain gauge 100 in that the strain gauge 100A includes a fourth resistor $130_4$ and a fifth resistor $130_5$. The fourth resistor $130_4$ and the fifth resistor $130_5$ are each arranged such that a grid direction of the resistor refers to the circumferential direction of the outer ring 10.

The fourth resistor $130_4$ is disposed at the same location in the circumferential direction as the second resistor $130_2$, but is disposed at a different location from the second resistor $130_2$ in the direction of the rotation axis m. The fifth resistor $130_5$ is disposed at the same location in the circumferential direction as the third resistor $130_3$, but is disposed at a different location from the third resistor $130_3$ in the direction of the rotation axis m. That is, the fourth resistor $130_4$ and the fifth resistor $130_5$ are at different locations in both the circumferential direction and the direction of the rotation axis m. The fourth resistor $130_4$ and the fifth resistor 130, are arranged to face each other such that the first resistor $130_1$ is interposed between the fourth resistor $130_4$ and the fifth resistor $130_5$ in a direction oblique to the centerline CL.

In this arrangement, by adding the fourth resistor $130_4$ and the fifth resistor $130_5$, in the case where the trajectory of the rolling element 30 illustrated in FIG. 6 is obtained, outputs from the fourth resistor $130_4$ and the fifth resistor $130_5$ are obtained, and thus accuracy in detecting the trajectory of the rolling element 30 can be increased.

Second Modification of First Embodiment

In second modifications of the first embodiment, variations in the arrangement of the resistors are described. In the second modifications of the first embodiment, description for the same components as those of the above embodiments may be omitted.

In a configuration of the rolling bearing according to the present invention, it is sufficient when the strain gauge includes three or more resistors, and further the three or more resistors include at least two resistors that are situated at different locations in the circumferential direction of the outer ring and in the direction of the rotation axis of the outer ring. In such a configuration, the trajectory of the rolling element 30 can be detected. Examples of the configuration will be described below, but the examples illustrated below are by no means a limitation.

Figure 10:
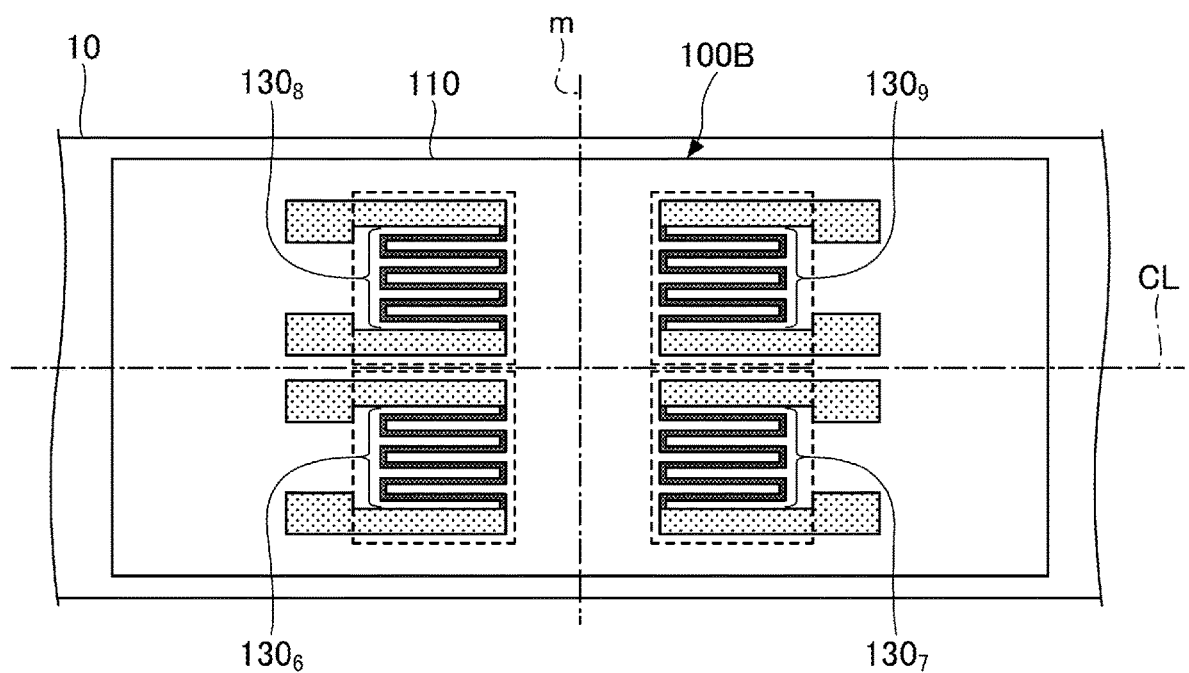
FIG. 10 is an enlarged view (first part) of the proximate portion of the strain gauge in a second modification of the first embodiment.

FIG. 10 is an enlarged view (first part) of the proximate portion of the strain gauge in the second modification of the first embodiment. Referring to FIG. 10, a strain gauge 100B includes a sixth resistor $130_6$, a seventh resistor $130_7$, an eighth resistor $130_8$, and a ninth resistor 130, that are disposed on the substrate 110. The sixth resistor $130_6$, the seventh resistor $130_7$, the eighth resistor $130_8$, and the ninth resistor 130, are each arranged such that the grid direction of the resistor refers to the circumferential direction of the outer ring 10.

The sixth resistor $130_6$ and the seventh resistor $130_7$ are disposed on one side of the centerline CL. The eighth resistor $130_8$ and the ninth resistor 130, are disposed on the other side of the centerline CL. The sixth resistor $130_6$ and the seventh resistor $130_7$ are situated at different locations in the circumferential direction, and the eighth resistor $130_8$ and the ninth resistor $130_9$ are situated at different locations in the circumferential direction. The sixth resistor $130_6$ and the eighth resistor $130_8$ are situated at the same location in the circumferential direction, and the seventh resistor $130_7$ and the ninth resistor $130_9$ are situated at the same location in the circumferential direction.

In the strain gauge 100B, when outputs of the sixth resistor $130_6$, the seventh resistor $130_7$, the eighth resistor $130_8$, and the ninth resistor 130, are approximately identical, the trajectory of the rolling element 30 illustrated in FIG. 5 can be detected. When the output of the sixth resistor $130_6$ is larger than the output of the eighth resistor $130_8$, and the output of the ninth resistor $130_9$ is larger than the output of the seventh resistor $130_7$, the trajectory of the rolling element 30 illustrated in FIG. 4 can be detected. When the output of the sixth resistor $130_6$ is smaller than the output of the eighth resistor $130_8$, and the output of the ninth resistor $130_9$ is smaller than the output of the seventh resistor $130_7$, the trajectory of the rolling element 30 illustrated in FIG. 6 can be detected.

As a distance between the sixth resistor $130_6$ and the eighth resistor $130_8$ and a distance between the seventh resistor $130_7$ and the ninth resistor $130_9$ are reduced, the output from each resistor can be increased in a case where the trajectory of the rolling element 30 illustrated in FIG. 5 is obtained.

Figure 11:
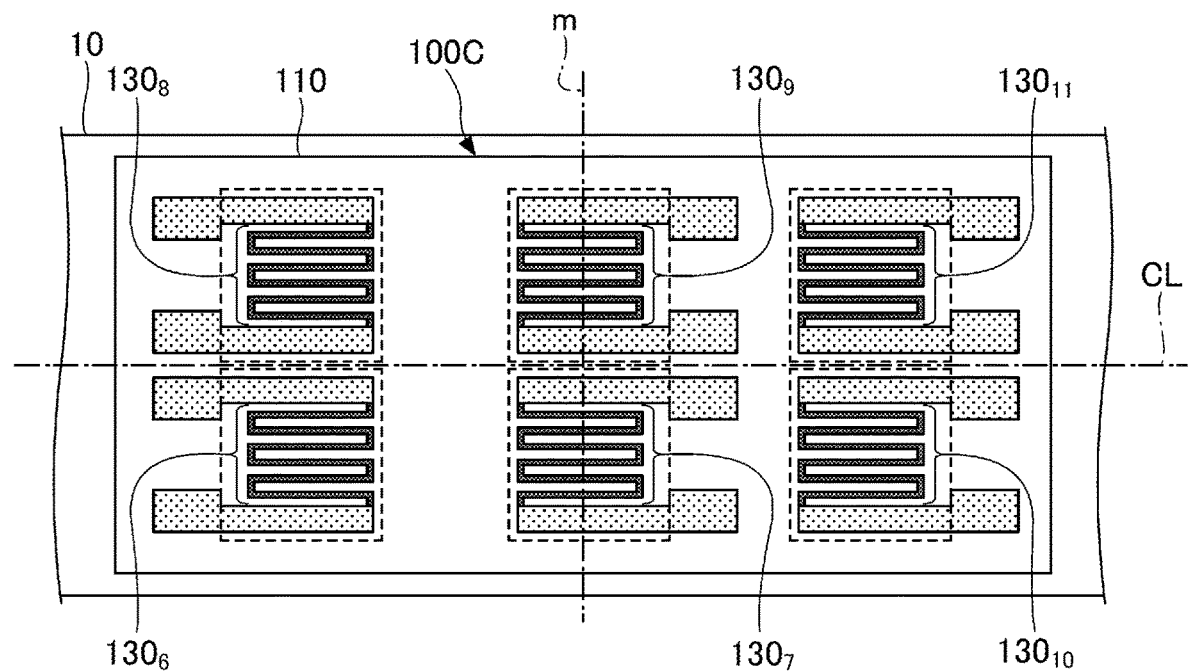
FIG. 11 is an enlarged view (second part) of the proximate portion of the strain gauge in the second modification of the first embodiment.

FIG. 11 is an enlarged view (second part) of the proximate portion of the strain gauge in the second modification of the first embodiment. Referring to FIG. 11, a strain gauge 100C differs from the strain gauge 100B in that the strain gauge 100C includes a tenth resistor $130_{10}$ and an eleventh resistor $130_{11}$. The tenth resistor $130_{10}$ and the eleventh resistor $130_{11}$, are each arranged such that the grid direction of the resistor refers to the circumferential direction of the outer ring 10.

The tenth resistor $130_{10}$ is disposed on one side of the centerline CL, and the eleventh resistor $130_{11}$ is disposed on the other side of the centerline CL. The tenth resistor $130_{10}$ and the eleventh resistor $130_{11}$ are situated at the same location in the circumferential direction. The tenth resistor $130_{10}$ and the sixth resistor $130_6$ are arranged in parallel to the centerline CL to face each other such that the seventh resistor $130_7$ is interposed between the tenth resistor $130_{10}$ and the sixth resistor $130_6$. The eleventh resistor $130_{11}$ and the eighth resistor $130_8$ are arranged in parallel to the centerline CL to face each other such that the ninth resistor $130_9$ is interposed between the eleventh resistor $130_{11}$ and the eighth resistor $130_8$.

In this arrangement, by adding the tenth resistor $130_{10}$ and the eleventh resistor $130_{11}$, outputs from the tenth resistor $130_{10}$ and the eleventh resistor $130_{11}$ are obtained in any case where the trajectory of the rolling element 30 illustrated in FIGS. 4 to 6 is obtained. Thus, accuracy in detecting the trajectory of the rolling element 30 can be increased.

Figure 12:
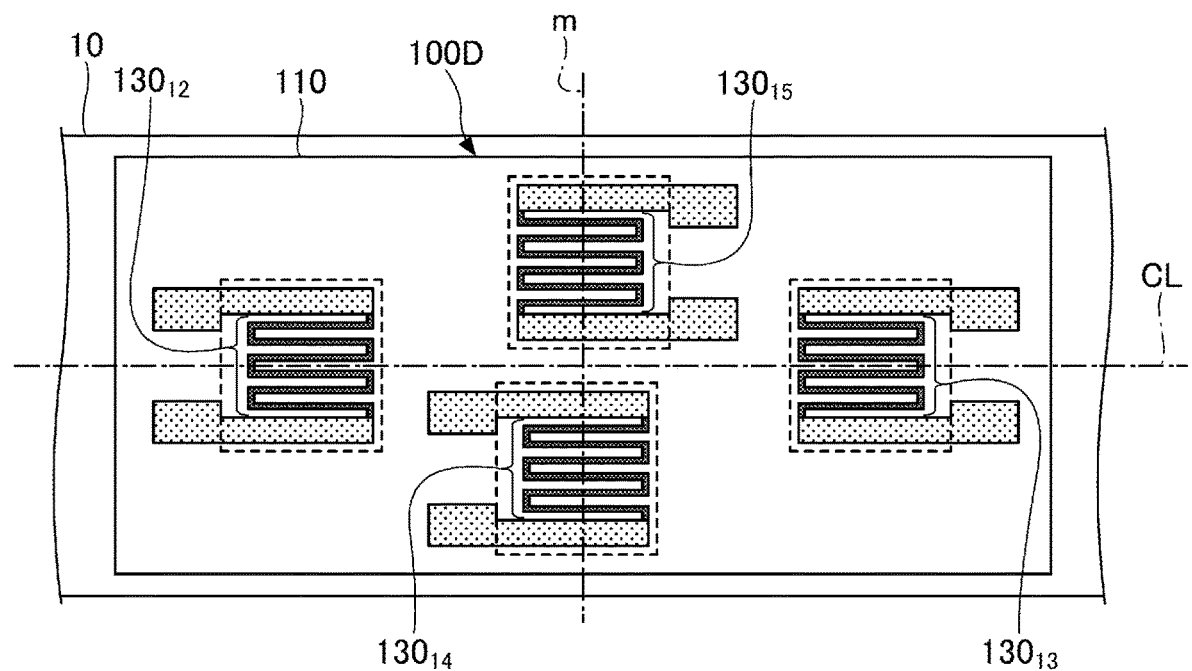
FIG. 12 is an enlarged view (third part) of the proximate portion of the strain gauge in the second modification of the first embodiment.

FIG. 12 is an enlarged view (third part) of the proximate portion of the strain gauge in the second modification of the first embodiment. Referring to FIG. 12, a strain gauge 100D includes a twelfth resistor $130_{12}$, a thirteenth resistor $130_{13}$, a fourteenth resistor $130_{14}$, and a fifteenth resistor $130_{15}$ that are arranged on the substrate 110. The twelfth resistor $130_{12}$, the thirteenth resistor $130_{13}$, the fourteenth resistor $130_{14}$, and the fifteenth resistor $130_{15}$; are each arranged such that the grid direction of the resistor refers to the circumferential direction of the outer ring 10.

The twelfth resistor $130_{12}$ and the thirteenth resistor $130_{13}$ are disposed on the centerline CL. The twelfth resistor $130_{12}$ and the thirteenth resistor $130_{13}$ may be each disposed, for example, such that a middle portion in the grid-width direction coincides with the centerline CL.

The fourteenth resistor $130_{14}$ is disposed between the twelfth resistor $130_{12}$ and the thirteenth resistor $130_{13}$ in the circumferential direction, and the fourteenth resistor $130_{14}$ is disposed on one side of the centerline CL. The fifteenth resistor $130_{15}$ is located between the twelfth resistor $130_{12}$ and the thirteenth resistor $130_{13}$ in the circumferential direction, and the fifteenth resistor $130_{15}$ is disposed on the other side of the centerline CL. The fourteenth resistor $130_{14}$ and the fifteenth resistor $130_{15}$ are situated at the same location in the circumferential direction.

In the strain gauge 100D, the trajectory of the rolling element 30 illustrated in FIG. 5 can be detected based on output levels of the twelfth resistor $130_{12}$ and the thirteenth resistor $130_{13}$. Further, when either a case where outputs of the twelfth resistor $130_{12}$ and the fifteenth resistor $130_{15}$ have an approximate level, or a case where outputs of the thirteenth resistor $130_{13}$ and the fourteenth resistor $130_{14}$ have an approximate level occurs, the trajectory of the rolling element 30 illustrated in FIG. 4 can be detected. When either a case where outputs of the twelfth resistor $130_{12}$ and the fourteenth resistor $130_{14}$ have an approximate level or a case where outputs of the thirteenth resistor $130_{13}$ and the fifteenth resistor $130_{15}$, have an approximate level occurs, the trajectory of the rolling element 30 illustrated in FIG. 6 can be detected.

Although the preferred embodiments and the like are described above in detail, the above embodiments and the like are by no means a limitation, and various modifications and substitutions to the above-described embodiments and the like can be made without departing from the scope set forth in the claims.

For example, in the above embodiments and the like, the example in which a given strain gauge is disposed on the outer peripheral surface of the outer ring to detect the strain in the outer ring is illustrated. However, the given strain gauge may be disposed on the inner peripheral surface of the inner ring to detect the strain in the inner ring. In this case, the trajectory of the rolling element 30 can be detected by arranging the resistors as illustrated in FIG. 3 or the like.

As described above, in the first embodiment and the modifications of the first embodiment, the example in which the resistor is used as each detector element of the strain gauge 100 is described. That is, in the first embodiment, the case where the strain gauge 100 is what is known as a "resistive strain gauge" is described. However, the strain gauge 100 in the present disclosure is not limited to the resistive strain gauge. For example, the strain gauge 100 may be a strain gauge that includes three or more detector elements that detect a magnetic change occurring in accordance with strain that is generated at the outer peripheral surface of the outer ring or the inner peripheral surface of the inner ring.

Specifically, the strain gauge 100 may be a strain gauge with detector elements that use a Villari effect (described below). The strain gauge 100 may be a strain gauge with detector elements each of which has a structure of a magnetic tunnel junction (described below). In the second embodiment, the strain gauge 100 with detector elements that use the Villari effect is described below. In the third embodiment, the strain gauge 100 with detector elements each of which has the structure of the magnetic tunnel junction is described below.

Second Embodiment

FIG. 13 is a diagram illustrating an example of a detector element 300 included in the strain gauge 100 according to the second embodiment. (a) of FIG. 13 is a plan view of the detector element 300 when viewed from the upper surface (that is, a surface opposite an attachment surface) of the detector element in a case where that the detector element is attached to the substrate 110, as in the resistors $130_1$, $130_2$, and $130_3$ in FIG. 1. Also, (b) of FIG. 13 is a cross-sectional view of the detector element 300, as illustrated in (a) of FIG. 13, defined by a plane taken along the line α-α'. One or more lines for the detector element 300 are not illustrated in all parts of FIG. 13. However, the detector element 300 may have a line for connecting a drive coil 320 described below and a power source, and may have a line for transmitting the current that is detected using a sensing coil 380.

As illustrated in (a) of FIG. 13, the detector element 300 includes the drive coil 320, the sensing coil 380, and a base layer 310. The sensing coil 380 is a coil in which the base layer 310 is used as a core material. The drive coil 320 is a coil in which the base layer 310 is used as a core material, and that is wound around the outer surface of the sensing coil. In this arrangement, the drive coil 320 and the sensing coil 380 form a dual structure in which the drive coil 320 is located outside and the sensing coil 380 is located inside. In this arrangement, by winding the sensing coil 380 inside the drive coil 320, an alternating magnetic field (described below) can be uniformly applied to the entire sensing coil 380. This improves the performance of the detector element 300.

The drive coil 320 is a coil for generating a magnetic field. When an alternating current is supplied from the power source to the drive coil 320, the drive coil 320 generates an alternating magnetic field around the drive coil. The base layer 310 is formed by covering an approximately flat metal plate (base metal 370 described below) with an insulating layer (insulating layer 360 described below). The metal plate of the base layer 310 is a magnetic material in the detector element 300. The metal plate of the base layer 310 is magnetized by the alternating magnetic field that is generated through the drive coil 320. The sensing coil 380 is a coil for detecting the strength of magnetism in the base metal 370. The material of the drive coil 320 and the sensing coil 380 is desirably a conductive metal such as Cu, Ag, Al, and Au, and an alloy of any metals of these metals. The number of turns, and a size of an cross-sectional area, for each of the drive coil 320 and the sensing coil 380 may be appropriately designed in light of the detection sensitivity of the strain required for the detector element 300.

The detector element 300 will be described in more detail with reference to the cross-sectional view in (b) of FIG. 13. The layers 340 to 360 described below form a structure in which these layers are wound around the base metal 370 as the core material. In (b) of FIG. 13, given layers expressed by the same numeral are continuously connected to each other while surrounding the base metal 370.

As described above, the detector element 300 has the structure in which the sensing coil 380 and the drive coil 320 are wound around the base layer 310. The base layer 310 has a structure in which the base metal 370 is covered with the insulating layer 360. The insulating layer 350 is formed to surround the insulating layer 360. The insulating layer 350 is a layer that includes the sensing coil 380, and is a layer in which each space between sensing coils 380 is filled with an insulating material. Further, the insulating layer 340 is formed so as to surround the insulating layer 350. The insulating layer 340 is a layer with the drive coil 320, and is a layer in which each space between drive coils 320 is filled with an insulating material.

The base metal 370 is preferably made of a soft magnetic material that includes an Fe—Si—Al alloy such as Sendust, or an Ni—Fe alloy such as Permalloy. The insulating layers 340, 350, and 360 are preferably dry films or cured resists such as photosensitive polyimide that do not affect the magnetic field.

As illustrated in the cross-sectional view in (b) of FIG. 13, the attachment surface of the detector element 300 is attached to the substrate 110. The detector element 300 may be a detector element that has a flat plate shape or a thin film shape as a whole. When the detector element 300 has the flat plate shape or the thin film shape, the detector element can be more easily attached to the substrate 110.

As described above, the detector element 300 according to the present embodiment includes the base metal 370 that is a magnetic element. When the current flows through the drive coil 320, the magnetic field is generated, and thus the base metal 370 is magnetized. In such a state, when strain is generated at the outer peripheral surface of the outer ring 10 or the inner peripheral surface of the inner ring 20 of the rolling bearing 1, the strain is transmitted to the substrate 110, and thus stress is applied to the base metal 370. When the stress is applied to the base metal 370, a magnetic permeability of the base metal 370 changes in accordance with the stress, and thus the strength of magnetism changes. Such a phenomenon in which the magnetic permeability and the strength of magnetism in the magnetic material change due to the stress applied to the magnetic material is referred to as the "Villari effect." In the configuration of the detector element 300, an alternating current voltage corresponding to the strength of magnetism in the base metal 370 is induced in the sensing coil 380 that is a pick-up coil. In this arrangement, in light of the principle of the Villari effect, the stress applied to the base metal 370 (that is, a degree of strain in the substrate 110) can be calculated based on a magnitude of the alternating current voltage. In the example illustrated in (a) of FIG. 13, the grid direction of the detector element 300 refers to the α-α' direction in (a) of FIG. 13.

In such a principle, the detector element 300 can detect the strain that is received by the substrate 110. That is, the detector element 300 functions as a detector element of the strain gauge 100.

The strain gauge 100 according to the present embodiment includes three or more detector elements 300 as described above. At least two of the detector elements 300 are arranged at different locations in the circumferential direction of the outer ring 10 or the inner ring 20, and at least two of the detector elements 300 are arranged at different locations in the rotation axis direction. In this arrangement, according to the present embodiment, the rolling bearing 1 capable of detecting the trajectory of the rolling element during rotation can be provided.

The detector elements 300 in the strain gauge 100 according to the present embodiment can be disposed at respective locations described in each of the first embodiment, the first modification of the first embodiment, and the second modifications of the first embodiment. That is, instead of the resistors 130 (resistors $130_1$ to $130_{15}$) according to the first embodiment, the detector elements 300 can be used. In this arrangement, each detector element 300 that provides the Villari effect can be used to detect the trajectory of the rolling element in the same manner as the case where the resistive strain gauge is used. Thus, the strain gauge 100 according to the present embodiment provides the same effects as those of the strain gauge 100 described in the first embodiment and the first and second modifications of the first embodiment.

Third Embodiment

FIG. 14 is a diagram illustrating an example of a detector element 500 included in the strain gauge 100 according to the third embodiment. FIG. 15 is a diagram illustrating another example of the detector element according to the third embodiment. FIG. 16 is a diagram illustrating still another example of the detector element according to the third embodiment. (a) of each of FIGS. 14 to 16 is a perspective view of a corresponding detector element among detector elements 500, 600, and 700. (b) of each of FIGS. 14 to 16 is a plan view of the corresponding detector element among the detector elements 500, 600, and 700, when viewed from a negative z-axis direction. (c) of each of FIGS. 14 to 16 is a cross-sectional view of the corresponding detector element, among the detector elements 500, 600, and 700, taken in a plane parallel to a zy plane. The surface of each of the detector elements 500, 600, and 700 to be attached to the outer ring 10 or the inner ring 20 is a flat surface (surface parallel to an xy plane) that is situated on a lower side (in a negative z-axis direction). In all of FIGS. 14 to 16, lines of the detector element are not illustrated. However, each of the detector elements 500, 600, and 700 may have one or more lines for coupling an upstream electrode 510 to a power source, and may include one or more lines for connecting a downstream electrode 520 and the power source, as described below.

As illustrated in (a) of FIG. 14, each of the detector elements 500, 600, and 700 includes the upstream electrode 510, the downstream electrode 520, magnetic films 530, and an insulating film 540. The insulating film 540 is interposed between the magnetic films 530 as illustrated in the figure. The magnetic films 530 and the insulating film 540 form a magnetic tunnel junction. That is, the detector element 500 has a structure in which electrodes are coupled to a structure of the magnetic tunnel junction.

In the following description, a positive z-axis direction is also referred to as an "upper side," and a negative z-axis direction is also referred to as a "lower side." A flexible substrate that is formed of a plastic film or the like may be further provided on the lower side of the upstream electrode 510 and/or the downstream electrode 520. The substrate may also serve as the substrate 110.

The magnetic film 530 is a thin magnetic nanofilm. The insulating film 540 is a thin nanofilm of an insulator. The materials of the magnetic film 530 and the insulating film 540 are not particularly restricted as long as the structure of the magnetic tunnel junction can be formed. For example, as the magnetic film 530, cobalt-iron-boron or an alloy or the like containing a ferromagnetic material with 3d transition metal, such as Fe, Co, and Ni, and the above materials. For the insulating film 540, silicon oxide, silicon nitride, aluminum oxide, magnesium oxide, or the like can be used.

The upstream electrode 510 and the downstream electrode 520 are electrodes for applying a voltage to the structure of the magnetic tunnel junction. In the examples of FIGS. 14 to 16, the current flows from the upstream electrode 510 to the downstream electrode 520. For example, in the case in (c) of FIG. 14, when the voltage is applied between the upstream electrode 510 and the downstream electrode 520, electrons flow from the upper magnetic film 530 into the lower magnetic film 530 through the insulating film 540. This is a phenomenon called "tunnelling," and the electric resistance obtained in a case where the electrons pass through the insulating film 540 is referred to as "tunnel resistance." In the examples in FIGS. 14 to 16, a junction of each electrode portion has a structure in which an end of the electrode is processed such that short pass for the current is not created through the structure of the magnetic tunnel junction.

When strain is applied to the detector element 500 through the substrate 110 or the like, a magnetic change occurs in the tunnel junction structure. More specifically, magnetization directions of the upper and lower magnetic films 530 do not match. When the magnetization directions of the upper and lower magnetic films 530 do not match, the tunnel resistance becomes large in comparison to a case where the magnetization directions are parallel to each other (tunnel magnetoresistance effect). With this arrangement, in the detector element 500 that has the above configuration, the current flowing between the electrodes decreases in accordance with the magnitude of the strain in the detector element 500 (more strictly, a portion of the magnetic tunnel junction). That is, the electrical resistance increases in accordance with an increasing magnitude of the strain. The detector element 500 can detect the strain based on a current magnitude with respect to an applied voltage. In this arrangement, by attaching the detector elements 500 to the outer ring 10 or the inner ring 20 in the rolling bearing 1, strain applied to the rolling bearing can be measured.

The detector element having the structure of the magnetic tunnel junction is not limited to the detector element illustrated in the example of FIG. 14. For example, the detector elements 600 and 700 as illustrated in FIGS. 15 and 16 can be adopted. As in the detector element 500, each of the detector element 600 illustrated in FIG. 15 and the detector element 700 illustrated in FIG. 16 has a configuration that includes the upstream electrode 510, the downstream electrode 520, the magnetic film 530, and the insulating film 540, and that provides a principle of detecting strain. The basic operation of the detector elements 600 and 700 is also the same as that of the detector element 500. The grid directions of the detector elements 500, 600, and 700 correspond to the y-axis directions (the positive y-axis direction and the negative y-axis direction) in FIGS. 14 to 16. As illustrated in FIG. 15, the detector element 600 has a structure in which the upper magnetic film 530 and the lower magnetic film 530 are partially connected to each other. That is, the structure of the magnetic tunnel junction is formed in only a partial region of the magnetic film 530, and a tunnel magnetoresistance effect occurs in the structure. On the other hand, the detector element 700 illustrated in FIG. 16 is attached to the substrate 110 via the substrate 710. As illustrated in FIGS. 14 to 16, design of the detector element may appropriately change according to the required size, durability, the magnitude of stress to be detected, and the like, as long as the principle described above is provided.

Each of the detector elements 500, 600, and 700 may include approximately the same flat plate shape, such as a plate film shape as a whole. In this arrangement, the detector element 500 can be easily attached to the substrate 110. Each of the detector elements 500, 600, and 700 may have a structure for applying a weak magnetic field to a structural portion such as a drive coil of the magnetic tunnel junction. By applying the magnetic field to the structural portion of the magnetic tunnel junction, the above-described tunnel magnetoresistance effect can be measure more stably. Thus, strain can be detected stably.

The "upstream electrode" and the "downstream electrode" in each of the detector elements 500, 600, and 700 are terms for the sake of convenience, and the direction in which the current flows may be reversed. That is, the detector elements 500, 600, and 700 illustrated in FIGS. 14 to 16 may be designed such that the current flows from the downstream electrode 520 to the upstream electrode 510.

The strain gauge 100 according to the present embodiment includes three or more detector elements 500; three or more detector elements 600; or three or more detector elements 700 as described above. In this case, at least two detector elements 500 of the detector elements 500, at least two detector elements 600 of the detector elements 600, or at least two detector elements 700 of the detector elements 700 are disposed such that locations of the detector elements in the circumferential direction of the outer ring 10 or the inner ring 20 are different from each other, and such that locations of the detector elements in the direction of the rotation axis are different from each other. In this arrangement, according to the present embodiment, the rolling bearing 1 capable of detecting the trajectory of a given rolling element during rotation can be provided.

The detector elements 500, 600, and 700 in the strain gauge 100 according to the present embodiment can be disposed at respective arrangement locations described in the first embodiment, the first modification of the first embodiment, and the second modifications of the first embodiment. That is, instead of a set of resistors 130 (resistors $130_1$ to $130_{15}$) according to the first embodiment, a set of detector elements 500, 600, or 700 can be used. In this arrangement, the detector elements 500, 600, and 700 that utilize the magnetic tunnel effect can be used to detect the trajectory of the rolling element, as in a case where the resistive strain gauge 100 is used. Thus, the strain gauge 100 according to the present embodiment provides the same effects as described in the strain gauge 100 according to the first embodiment and the first and second modifications of the first embodiment.

Although the preferred embodiments and the like are described above in detail, the described embodiments and the like are by no means a limitation. Various modifications and substitutions can be made to the above embodiments and the like without departing from the scope described in the claims.

For example, in the above embodiments and the like, an example in which a given strain gauge is disposed on the outer peripheral surface of the outer ring to detect the strain in the outer ring is illustrated. However, the given strain gauge is disposed on the inner peripheral surface of the inner ring to detect the strain in the inner ring. In this case, the trajectory of the rolling element 30 can be detected by arranging the resistors as illustrated in FIG. 3 or the like.

This International Application claims priority to Japanese Patent Application No. 2021-111064, filed Jul. 2, 2021, the contents of which are incorporated herein by reference in their entirety.

REFERENCE SIGNS LIST 1 rolling bearing, 10 outer ring, 11, 21, 41 recess, 20 inner ring, 30 rolling element, 40 holder, 42 back portion, 51, 52, seal, 60 housing, 70 race, 100 100A, 100B, 100C, 100D strain gauge, 110 substrate, 110a upper surface, $130_1$ first resistor (detector element), $130_2$ second resistor (detector element), $130_3$ third resistor (detector element), $130_4$ fourth resistor (detector element), $130_5$ fifth resistor (detector element), $130_6$ sixth resistor (detector element), $130_7$ seventh resistor (detector element), $130_8$ eighth resistor (detector element), $130_9$ ninth resistor (detector element), $130_{10}$ tenth resistor (detector element), $130_{11}$ eleventh resistor (detector element), $130_{12}$ twelfth resistor (detector element), $130_{13}$ thirteenth resistor (detector element), $130_{14}$ fourteenth resistor (detector element), $130_{15}$ fifteenth resistor (detector element), $130e_1$, $130e_2$ end, 140 line, 141, 151 first metal layer, 142, 152 second metal layer, 150 electrode, 160 cover layer, 300, 500, 600, 700 detector element, 310 base layer, 320 drive coil, 340, 350, 360 insulating layer, 370 base metal, 380 sensing coil, 510 upstream electrode, 520 downstream electrode, 530 magnetic film, 540 insulating film, 710 substrate

The invention claimed is:

1. A rolling bearing comprising:
an outer ring having a predetermined rotation axis;
an inner ring disposed coaxially with the outer ring, and situated on an inner peripheral side of the outer ring;
multiple rolling elements disposed between the outer ring and the inner ring, the multiple rolling being arranged in a single row in a circumferential direction of the outer ring or the inner ring; and
a strain gauge disposed on an outer peripheral surface of the outer ring or an inner peripheral surface of the inner ring,
wherein the strain gauge includes three or more detector elements that are disposed on the outer peripheral surface of the outer ring or the inner peripheral surface of the inner ring,
wherein the three or more detector elements include at least two detector elements at different locations in the circumferential direction of the outer ring or the inner ring, the at least two detector elements being situated at different locations in a direction of the rotation axis, and
wherein each of the at least two detector elements is configured to output a signal that changes in accordance with a trajectory of the multiple rolling elements arranged in the single row in the circumferential direction of the outer ring or the inner ring.

2. The rolling bearing according to claim 1, wherein the three or more detector elements are three or more resistors.

3. The rolling bearing according to claim 2, wherein each of the three or more resistors is arranged such that a grid direction of the resistor is parallel to the circumferential direction of the outer ring or the inner ring.

4. The rolling bearing according to claim 3, wherein the three or more resistors include at least three resistors at different locations in the circumferential direction and the direction of the rotation axis.

5. The rolling bearing according to claim 4, wherein the at least three resistors at the different locations in the circumferential direction and the direction of the rotation axis include:
a first resistor disposed on an imaginary line that divides the outer peripheral surface of the outer ring or the inner peripheral surface of the inner ring into two portions in the direction of the rotation axis,
a second resistor disposed on one side of the first resistor in the circumferential direction and on one side of the imaginary line in the direction of the rotation axis, and
a third resistor disposed on the other side of the first resistor in the circumferential direction and on the other side of the imaginary line in the direction of the rotation axis, and
wherein the second resistor and the third resistor are disposed to face each other such that the first resistor is interposed between the second resistor and the third resistor.

6. The rolling bearing according to claim 5, wherein the at least three resistors at the different locations in the circumferential direction and the direction of the rotation axis include:
a fourth resistor disposed at a same location as the second resistor in the circumferential direction and at a different location from the second resistor in the direction of the rotation axis, and
a fifth resistor disposed at a same location as the third resistor in the circumferential direction and at a different location from the third resistor in the direction of the rotation axis, and
wherein the fourth resistor and the fifth resistor are disposed to face each other such that the first resistor is interposed between the fourth resistor and the fifth resistor.

7. The rolling bearing according to claim 3, wherein three resistors include:
a first resistor and a second resistor that are disposed on one side of an imaginary line that divides the outer peripheral surface of the outer ring or the inner peripheral surface of the inner ring into two portions in the direction of the rotation axis, and
a third resistor and a fourth resistor that are disposed on the other side of the imaginary line,
wherein the first resistor and the second resistor are situated at different locations in the circumferential direction, and the third resistor and the fourth resistor are situated at different locations in the circumferential direction, and
wherein the first resistor and the third resistor are at a same location in the circumferential direction, and the second resistor and the fourth resistor are at a same location in the circumferential direction.

8. The rolling bearing according to claim 7, wherein the three resistors include:
a fifth resistor disposed on the one side of the imaginary line, and a sixth resistor disposed on the other side of the imaginary line, wherein the fifth resistor and the sixth resistor are at a same location in the circumferential direction, wherein the fifth resistor and the first resistor are disposed to face each other such that the second resistor is interposed between the fifth resistor and the first resistor, and wherein the sixth resistor and the third resistor are disposed to face each other such that the fourth resistor is interposed between the sixth resistor and the third resistor.

9. The rolling bearing according to claim 3, wherein the three or more resistors include:
   a first resistor and a second resistor that are disposed on an imaginary line that divides the outer peripheral surface of the outer ring or the inner peripheral surface of the inner ring into two portions in the direction of the rotation axis,
   a third resistor disposed between the first resistor and the second resistor in the circumferential direction, the third resistor being situated on one side of the imaginary line, and
   a fourth resistor disposed on the other side of the imaginary line, and
   wherein the third resistor and the fourth resistor are disposed at a same location in the circumferential direction.

10. The rolling bearing according to claim 2, wherein each of the resistors is formed of a film including Cr, CrN, and $Cr_2N$.

11. The rolling bearing according to claim 10, wherein each of the resistors includes CrN and $Cr_2N$ at 20 wt % or less.

12. The rolling bearing according to claim 11, wherein a percentage of $Cr_2N$ in CrN and $Cr_2N$ is greater than or equal to 80 wt % and less than 90 wt %.

13. The rolling bearing according to claim 2, wherein a gauge factor of the strain gauge is 10 or more.

14. The rolling bearing according to claim 1, wherein each of the multiple detector elements is a detector element configured to detect a magnetic change that occurs in accordance with strain that is generated at the outer peripheral surface of the outer ring or the inner peripheral surface of the inner ring.

15. The rolling bearing according to claim 14, wherein each of the three or more detector elements is arranged such that a grid direction of the detector element is parallel to the circumferential direction of the outer ring or the inner ring.

16. The rolling bearing according to claim 15, wherein the three or more detector elements include at least three detector elements at different locations in the circumferential direction and the direction of the rotation axis.

17. The rolling bearing according to claim 16, wherein the at least three detector elements at the different locations in the circumferential direction and the direction of the rotation axis include:
   a first detector element disposed on an imaginary line that divides the outer peripheral surface of the outer ring or the inner peripheral surface of the inner ring into two portion in the direction of the rotation axis,
   a second detector element disposed on one side of the first detector element in the circumferential direction, the second detector element being situated on one side of the imaginary line in the direction of the rotational axis, and
   a third detector element disposed on the other side of the first detector element in the circumferential direction, the third detector element being situated on the other side of the imaginary line in the direction of the rotational axis, and
   wherein the second detector element and the third detector element are disposed to face each other such that the first detector element is interposed between the second detector element and the third detector element.

18. The rolling bearing according to claim 17, wherein the at least three detector elements at the different locations in the circumferential direction and the direction of the rotation axis include:
   a fourth detector element that is situated at a same location as the second detector element in the circumferential direction, the fourth detector element being at a different location from the second detector element in the direction of the rotation axis, and
   a fifth detector element that is situated at a same location as the third detector element in the circumferential direction, the fifth detector element being situated at a different location from the third detector element in the direction of the rotation axis, and
   wherein the fourth detector element and the fifth detector element are disposed to face each other such that the first detector element is interposed between the fourth detector element and the fifth detector element.

19. The rolling bearing according to claim 15, wherein the three or more detector elements include:
   a first detector element and a second detector element that are disposed on one side of an imaginary line that divides the outer peripheral surface of the outer ring or the inner peripheral surface of the inner ring into two portions in the direction of the rotation axis, and
   a third detector element and a fourth detector element that are disposed on the other side of the imaginary line,
   wherein the first detector element and the second detector element are situated at different locations in the circumferential direction, and the third detector element and the fourth detector element are situated at different locations in the circumferential direction, and
   wherein the first detector element and the third detector element are situated at a same location in the circumferential direction, and the second detector element and the fourth detector element are situated at a same location in the circumferential direction.

20. The rolling bearing according to claim 19, wherein the three or more detector elements include:
   a fifth detector element disposed on the one side of the imaginary line, and
   a sixth detector element disposed on the other side of the imaginary line,
   wherein the fifth detector element and the sixth detector element are situated at a same location in the circumferential direction,
   wherein the fifth detector element and the first detector element are disposed to face each other such that the second detector element is interposed between the fifth detector element and the first detector element, and
   wherein the sixth detector element and the third detector element are disposed to face each other such that the fourth detector element is interposed between the sixth detector element and the third detector element.

21. The rolling bearing according to claim 15, wherein the three or more detector elements include:
   a first resistor and a second resistor that are disposed on an imaginary line that divides the outer peripheral surface of the outer ring or the inner peripheral surface of the inner ring into two portions in the direction of the rotation axis, a third resistor disposed between the first resistor and the second resistor in the circumferential direction, the third resistor being situated on one side of the imaginary line, and a fourth resistor disposed on the other side of the imaginary line, and wherein the third resistor and the fourth resistor are situated at a same location in the circumferential direction.

22. The rolling bearing according to claim 14, wherein a gauge factor of the strain gauge is 10 or more.

23. The rolling bearing according to claim 14, wherein each of the detector elements includes a magnetic element, and wherein each detector element is a detector element configured to detect a change in strength of magnetism in the magnetic element in a case where pressure is applied to the magnetic element due to strain that is generated at the outer peripheral surface of the outer ring or the inner peripheral surface of the inner ring.

24. The rolling bearing according to claim 14, wherein each of the detector elements includes a structure of a magnetic tunnel junction in which an insulating film is interposed between magnetic films, and wherein each detector element includes a detector element configured to detect a magnetic change that occurs in the structure in accordance with strain that is generated at the outer peripheral surface of the outer ring or the inner peripheral surface of the inner ring.

25. A rolling bearing comprising:
an outer ring having a predetermined rotation axis;
an inner ring disposed coaxially with the outer ring, and situated on an inner peripheral side of the outer ring;
multiple rolling elements disposed between the outer ring and the inner ring; and
a strain gauge disposed on an outer peripheral surface of the outer ring or an inner peripheral surface of the inner ring,
wherein the strain gauge includes three or more detector elements that are disposed on the outer peripheral surface of the outer ring or the inner peripheral surface of the inner ring, and
wherein the three or more detector elements include at least two detector elements at different locations in a circumferential direction of the outer ring or the inner ring, the at least two detector elements being situated at different locations in a direction of the rotation axis,
wherein the three or more detector elements are three or more resistors,
wherein the three or more resistors are each arranged such that a grid direction of the resistor is parallel to the circumferential direction of the outer ring or the inner ring, and
wherein the three or more resistors include at least three resistors at different locations in the circumferential direction and the direction of the rotation axis.

26. A rolling bearing comprising:
an outer ring having a predetermined rotation axis;
an inner ring disposed coaxially with the outer ring, and situated on an inner peripheral side of the outer ring;
multiple rolling elements disposed between the outer ring and the inner ring; and
a strain gauge disposed on an outer peripheral surface of the outer ring or an inner peripheral surface of the inner ring,
wherein the strain gauge includes three or more detector elements that are disposed on the outer peripheral surface of the outer ring or the inner peripheral surface of the inner ring,
wherein the three or more detector elements include at least two detector elements at different locations in a circumferential direction of the outer ring or the inner ring, the at least two detector elements being situated at different locations in a direction of the rotation axis,
wherein the three or more detector elements are three or more resistors,
wherein each of the resistors is formed of a film including Cr, CrN, and $Cr_2N$, and
wherein each of the resistors includes CrN and $Cr_2N$ at 20 wt % or less.

27. A rolling bearing comprising:
an outer ring having a predetermined rotation axis;
an inner ring disposed coaxially with the outer ring, and situated on an inner peripheral side of the outer ring;
multiple rolling elements disposed between the outer ring and the inner ring; and
a strain gauge disposed on an outer peripheral surface of the outer ring or an inner peripheral surface of the inner ring,
wherein the strain gauge includes three or more detector elements that are disposed on the outer peripheral surface of the outer ring or the inner peripheral surface of the inner ring,
wherein the three or more detector elements include at least two detector elements at different locations in a circumferential direction of the outer ring or the inner ring, the at least two detector elements being situated at different locations in a direction of the rotation axis,
wherein each of the multiple detector elements is a detector element configured to detect a magnetic change that occurs in accordance with strain that is generated at the outer peripheral surface of the outer ring or the inner peripheral surface of the inner ring,
wherein the three or more detector elements are each arranged such that a grid direction of the detector element is parallel to the circumferential direction of the outer ring or the inner ring, and
wherein the three or more detector elements include at least three detector elements at different locations in the circumferential direction and the direction of the rotation axis.

28. A rolling bearing comprising:
an outer ring having a predetermined rotation axis;
an inner ring disposed coaxially with the outer ring, and situated on an inner peripheral side of the outer ring;
multiple rolling elements disposed between the outer ring and the inner ring; and
a strain gauge disposed on an outer peripheral surface of the outer ring or an inner peripheral surface of the inner ring,
wherein the strain gauge includes three or more detector elements that are disposed on the outer peripheral surface of the outer ring or the inner peripheral surface of the inner ring,
wherein the three or more detector elements include at least two detector elements at different locations in a circumferential direction of the outer ring or the inner ring, the at least two detector elements being situated at different locations in a direction of the rotation axis, wherein each of the multiple detector elements is a detector element configured to detect a magnetic change that occurs in accordance with strain that is generated at the outer peripheral surface of the outer ring or the inner peripheral surface of the inner ring, wherein each of the detector elements includes a structure of a magnetic tunnel junction in which an insulating film is interposed between magnetic films, and wherein each detector element includes a detector element configured to detect a magnetic change that occurs in the structure in accordance with strain that is generated at the outer peripheral surface of the outer ring or the inner peripheral surface of the inner ring.

* * * * *